United States Patent
Dojka et al.

(10) Patent No.: US 11,553,036 B2
(45) Date of Patent: Jan. 10, 2023

(54) SYSTEM AND METHOD FOR CLOUD SECURITY MONITORING

(71) Applicant: KPMG LLP, New York, NY (US)

(72) Inventors: Wojciech K. Dojka, Allendale, NJ (US); Kevin Ray Scott, Plainwell, MI (US); Gregory Schellenberg, Douglaston, NY (US)

(73) Assignee: KPMG LLP, New York, NY (US)

( * ) Notice: Subject to any disclaimer, the term of this patent is extended or adjusted under 35 U.S.C. 154(b) by 309 days.

(21) Appl. No.: 16/870,450

(22) Filed: May 8, 2020

(65) Prior Publication Data
US 2021/0352136 A1  Nov. 11, 2021

(51) Int. Cl.
| G06F 15/173 | (2006.01) |
| H04L 67/1001 | (2022.01) |
| H04L 67/00 | (2022.01) |
| G06F 8/65 | (2018.01) |
| H04L 9/40 | (2022.01) |

(52) U.S. Cl.
CPC ........... H04L 67/1001 (2022.05); G06F 8/65 (2013.01); H04L 63/1416 (2013.01); H04L 63/1433 (2013.01); H04L 67/34 (2013.01)

(58) Field of Classification Search
CPC ... G06F 8/65; H04L 63/0807; H04L 63/1416; H04L 63/1433; H04L 63/20; H04L 67/34; H04L 67/1001
USPC .............................. 709/206, 223, 224; 726/3
See application file for complete search history.

(56) References Cited

U.S. PATENT DOCUMENTS

| 10,855,722 | B1* | 12/2020 | Vadlamani | .......... H04L 63/1408 |
| 2015/0095973 | A1* | 4/2015 | Neumueller | ............ H04L 63/20 726/1 |
| 2020/0252803 | A1* | 8/2020 | Shah | .................... H04L 63/1416 |
| 2021/0185077 | A1* | 6/2021 | Shavlik | ............... H04L 63/1433 |

OTHER PUBLICATIONS https://github.com/microsoft/AzureFunctionforSplunkVS, Azure Function for Splunk VS, Dec. 10, 2020, pp. 1-8.

(Continued)

*Primary Examiner* — Liang Che A Wang
(74) *Attorney, Agent, or Firm* — Hunton Andrews Kurth LLP

(57) ABSTRACT

The invention relates to a computer-implemented system for security monitoring of Member accounts in a cloud environment. The Member accounts are provided as instances of cloud services in one or more monitored clouds by one or more cloud service providers. The system is programmed to automatically deploy software agents to the Member accounts. The software agents are configured to monitor activities in the Member accounts and to push security and operations data to a SIEM platform. The security and operations data may comprise alerts and activity logs for the Member accounts, public internet protocol (IP) addresses used by the Member accounts, and identifying information for individuals and information technology (IT) assets associated with the Member accounts. The system includes a user interface to define customized alerts based on the security and operations data, and the system generates and sends the customized alerts to a system administrator or security analyst.

28 Claims, 18 Drawing Sheets

(56) References Cited

OTHER PUBLICATIONS https://github.com/splunk/splunk-aws-project-trumpet, Trumpet, Jun. 22, 2020, pp. 1-8.
https://github.com/splunk/splunk-aws-project-trumpet/commit/b83bcb08e356e3e1bc4b55fd1c9635cf10d4ae4e, README formatting updates, Aug. 23, 2018, pp. 1-3.

* cited by examiner

SYSTEM AND METHOD FOR CLOUD SECURITY MONITORING

FIELD OF THE INVENTION

The present invention relates generally to a system and method for cloud security monitoring.

BACKGROUND

Cloud services have become targets for threat actors and insider threats who seek unauthorized access to sensitive data stored in the cloud. Conventional cloud services have logs that record instances of attempted access and other actions. However, threat actors may attempt to delete such logs, and in some cases, even administrators may tamper with or delete such logs for illegitimate purposes. Additionally, regulatory compliance frameworks may dictate requirements for log retention and immutable properties that cloud security monitoring enforces. Another challenge that business entities may face in securing their data is the utilization of multiple instances of multiple cloud services, such as Amazon Web Services, Microsoft Azure, Google Cloud Platform, or others. It is desirable that such a business entity be able to collect logs from various cloud services to allow its information technology (IT) and security teams the ability to perform threat analysis, incident response, vulnerability assessment, operational monitoring, application monitoring, cloud inventory, or near real-time compliance validation on monitored cloud environments from a central "pane of glass." However, conventional security monitoring of cloud services may typically involve labor-intensive deployment procedures and inconsistent processes across cloud providers, such as manual implementation of various configurations to deploy security monitoring measures in the cloud. This type of manual deployment may lead to drift from needed logging configurations by requiring the administration team to account for the logging configurations on resources deployed.

Exemplary embodiments of the invention provide systems and methods to overcome these and other disadvantages of known systems and methods.

SUMMARY

Systems and methods for performing cloud security monitoring (CSM) are described herein. The monitored cloud may be a commercial or government partition that provides cloud services such as Amazon Web Services (AWS), Microsoft Azure, Google Cloud Platform (GCP), or another cloud service. A Security Incident and Event Management (SIEM) platform may be provided, for example, in another cloud instance for the purposes of security monitoring, which is separate from the monitored cloud. The STEM platform can act as the final aggregation and archive location for alerts and logs generated in any of the cloud service providers. It can also provide the platform that enables analysts to perform analytics, reporting, and alerting across the cloud environments.

According to one embodiment, the cloud security monitoring system may include automated collection or scraping of assigned public internet protocol (IP) addresses from monitored clouds for the purpose of updating the vulnerability assessment platform on a periodic basis. This may be accomplished via the use of dedicated scripts that are designed to interrogate the cloud providers' API endpoint(s) with specific queries that are constructed to extract the needed public IP information (public IPs, ports, other configurations), parse the output from the API endpoint(s), format the data, and forward the final output to various locations. The scripts may be run from the cloud service provider's serverless services (e.g., Azure Functions, AWS Lambda (k), etc.) to eliminate the need to maintain virtual servers and reduce downtimes caused by virtual server operational interruptions or misconfigurations. Frequent collection, updating, and analysis of the public IP addresses allows the CSM system to alert IT teams to configurations that elevate the risk of an asset being accessed by unauthorized entities and used for nefarious activities. Frequently, threat actors or malicious software utilize the public IP interfaces assigned to IT assets to pivot onto the network, access and exfiltrate corporate data, or perform attacks against the IT infrastructure of other organizations. By performing an analysis of the perimeter (public IP addresses in use, ports exposed to the Internet, and services sending/receiving network communications) of each environment, the attack surface may be understood and appropriate actions taken to accept the risk or remediate the configuration that could be leveraged against an organization by threat actors. The CSM system may also be configured to remediate such configurations by taking action to remove or adjust the firewall rules that allow network communication to that public IP, port, or service. This may be accomplished by sets of scripts used by serverless technologies. These scripts have the intelligence built into the automation to interact with the management plane of the cloud provider via its API endpoint to make the adjustments to the firewall rules that are applied to the public interface assigned to the asset. Additionally, the same automation may be used by the anomaly detection service to shut down a network communication path that generated an alert noting an attack against the resource by threat actors.

The cloud security monitoring system and method may include fully automated deployment of an entire cloud security monitoring stack in the monitored cloud. According to one embodiment, the cloud security monitoring system and method may include automated deployment of CSM code to all regions servicing the business, and automated deployment of the CSM code to one or more additional regions based on usage. This is accomplished through the use of templates (e.g., Azure Resource Manager templates, AWS Cloud formation templates, etc.) and deployment scripts (e.g., PowerShell, Bash, etc.) to automate the needed configuration and resource deployments that support CSM. Templates are used to deploy the infrastructure that supports the flow of log data to the STEM platform. The scripts are used to interact with the management plane's API endpoint and allow for configurations (e.g., activation of logging configurations on existing resources, creation of service accounts, enablement and configuring of specific services not supported in templates) across the cloud environment to be adjusted in support of CSM. The CSM code may be configured to automatically push cloud logs generated in the monitored cloud (e.g., AWS or Azure) to the Security Incident and Event Management (SIEM) platform (e.g., Splunk). Collection of the cloud logs in the SIEM platform allows the system administrator to create custom queries and alerts, which may provide near real-time visibility into the operation of all cloud services utilized by the business entity (e.g., AWS, Azure, Google Cloud Platform). The cloud security monitoring system and method may also include an automated notification to alert a system administrator when a log fails to be delivered to the STEM platform. In the event the automation is processing events to be sent to the SIEM platform and an error is encountered in the transmission of the log to the STEM, the automation has the capability of noting the error in its processing logs and archiving the cloud logs that failed transmission in the cloud provider's storage solution (e.g., Azure storage blob, AWS S3 bucket, etc.). When new cloud logs that failed transmission are deposited into the storage structure, automation is triggered with the purpose of notifying defined contacts of the failure. The administrator that received the failure notification may retrieve the automations processing logs to determine the root cause of the transmission failure for remediation. Additionally, the administrator may collect the logs which failed delivery to the SIEM platform from the storage structure and re-inject them into the log streams via a set of pre-defined commands that interact with the cloud providers' API endpoint(s), thus allowing for failed log delivery to the SIEM platform once the failure root cause has been remediated. This allows for no loss of log data in the event of failure.

According to another embodiment, the cloud security monitoring system and method may include automatic adjustment of throughput between a Logging account, which may reside in the monitored cloud, and the STEM platform, to address service thresholds. To accomplish this, the automation monitors the processing logs of the service (e.g., AWS Kinesis FireHose) and when an event is encountered with an entry stating, for example, WriteProvisionedThroughputExceeded the automation may increment the number of shards assigned to the AWS Kinesis FireHose output stream. Adjusting the number of shards assigned to each stream allows the throughput to be expanded or contracted on a per log type basis.

The cloud security monitoring system and method may include other advantageous features. For example, the CSM system and method may provide automatic configuration of a list of available monitoring services that is customized based on the particular use case of the cloud service. The CSM system and method may include automatic remediation, automatic healing, or automatic fixing of misconfigured resources that caused cloud security monitoring to fail. In support of this feature, CSM can utilize the cloud provider's compliance engine (e.g., Azure Policy, AWS Config, GCP Forseti, etc.). A set of CSM compliance (custom or cloud provider managed) rules can be deployed with a template. These rules are used by the compliance engine to assess the configuration of the resource and determine if the resource has the necessary configurations to support log collection by CSM. In the event that the resource is non-compliant with CSM configurations, automation (e.g., Azure Policy DeployIfNotExists, AWS Lambda ($\lambda$)) is triggered that is designed to remediate the configuration and bring the resource into compliance with CSM configurations. In AWS, Lambda ($\lambda$) functions are scripted to interact with the API endpoint(s) that service the non-compliant resource. Commands are constructed and sent to the API endpoint(s) by the automation to bring the non-compliant resource into compliance with CSM configurations. In Azure, Azure Policy is leveraged with a DeployIfNotExists setting that allows the compliance engine to make the needed configuration changes based on the policy Rule Definition used to assess the resource. The compliance of the CSM configurations across resources is reported to the SIEM platform for alerting, reporting, and auditing.

The CSM system and method may include a feature that allows for identity and asset scrapping functionality that collects inventory and configuration information on all identities and resources (e.g., servers, services, storage structures, databases, etc.) provisioned within the cloud environment. This information, when combined with the cloud logs in the Security Incident and Event Management (STEM) platform, allows the CSM system to provide a more comprehensive and insightful analysis of the use of the cloud services. Additionally, the inventory of identities and assets may be used to create or populate a Configuration Management Database (CMDB) for cloud environments.

The CSM systems and methods may allow a business entity to reliably perform cloud security monitoring in multi-tenant environments and allows for a single pane of glass across the cloud estate. Aggregating the cloud log data, inventory, and alerts from various tenants in separate cloud providers allows for a central analysis portal to perform effective monitoring without inducing fatigue; from multiple logins, complexity of determining source environment, multiple identities, etc. Additionally, it can reduce time of response to alerts by providing a single place to receive alerts from multiple tenants and across multiple cloud service providers. In this embodiment, the monitoring analyst is not required to log into each environment, review the alerts, and move on to the next environment. Removing this manual review both reduces the time of response and can eliminate failure to respond as it eliminates confusion caused by alerting mechanisms that don't track status and assigned resources (e.g., email based alerts, instant messaging based alerts, etc.). In CSM, the alerts are collected by means of automation that is designed to interact with the API endpoint that services the anomaly detection technology. The automation performs a series of queries targeting the API endpoint and extracts any newly generated alerts. This collection method is extended to also capture alerts generated by other STEM software. Extending CSM to also collect alerts being generated by member SIEMs allows environment administrators the flexibility to use STEM technologies of their own choosing, while providing the needed visibility into their environments.

The Cloud Security Monitoring model puts into place automation that assesses the logging configurations of resources deployed within the account. This automation can be used to enable logging on resources that were deployed without the needed logging capabilities enabled. Intelligence can be built into the automation that allows it to determine the location where each resource type needs to send their logs and is able to apply this knowledge to the logging configuration of the resource. Typical solutions also require access to the Member accounts in the form of a service account to allow the monitoring solution to "pull" logs from the environment. The Cloud Security Monitoring (CSM) solution provides the ability for a "push" architecture that allows for a "zero access model" to monitor the Member account. Having this capability allows for scalability, performance increases, and reduction of attack surface over traditional "pull" methodologies.

The Cloud Security Monitoring model makes use of an aggregation environment before logs are pushed to the STEM. This allows the automation to continue servicing other integrated environments in the event that a compromise of a workload in a monitored environment occurs. Additionally, this allows for a central place to update the automation with new iterations of CSM source code. To accomplish this, CSM makes use of cross environment policies assigned to the identities. In Azure, the identity is given the appropriate permissions at the subscription level and this allows all resources to inherit and allow retrieval of log data where defined in the permissions. In AWS, roles are defined to allow the automation to retrieve the appropriate log data or allow services to interconnect with each other (e.g., AWS CloudWatch to AWS Kinesis Data Streams). This is handled via the policies assigned to the roles. The credentials in use are managed by the CSP and are rotated for each session.

These and other advantages will be described more fully in the detailed description below.

BRIEF DESCRIPTION OF THE DRAWINGS

In order to facilitate a fuller understanding of the invention, reference is made to the attached drawings. The drawings should not be construed as limiting the invention, but are intended only to illustrate different aspects and embodiments of the invention.

DETAILED DESCRIPTION

Figure 1:
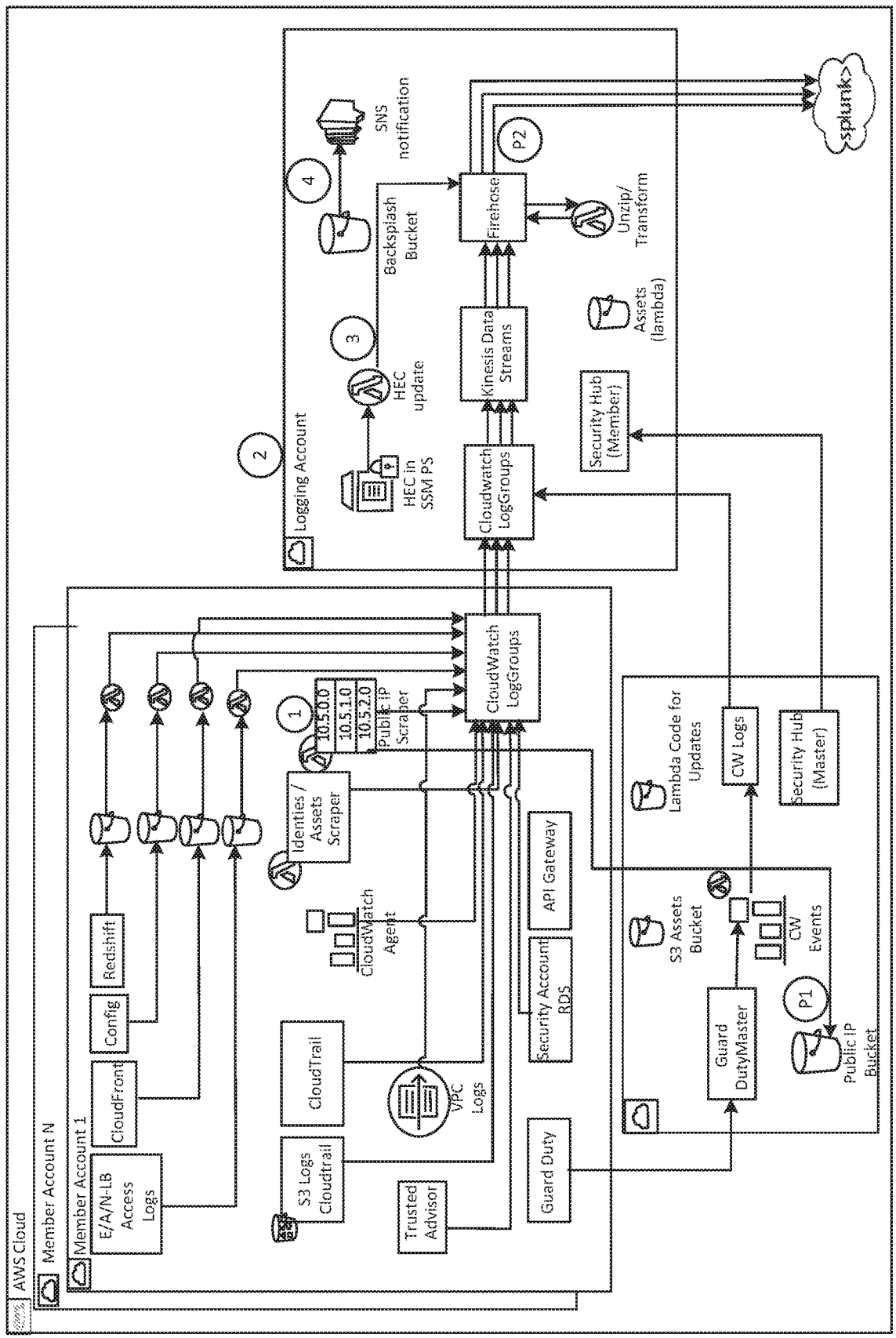
FIG. 1 illustrates an example of a cloud security monitoring system with multiple Member accounts in AWS cloud according to an embodiment of the invention.

Exemplary embodiments of the invention will be described in order to illustrate various features of the invention. The embodiments described herein are not intended to be limiting as to the scope of the invention, but rather are intended to provide examples of the components, use, and operation of the invention. For example, although some embodiments may be described in which the monitored cloud comprises an Amazon Webs Services (AWS) cloud or Microsoft Azure cloud, the scope of the invention is not limited to these two types of clouds. Moreover, although some embodiments may be described in which the security incident and event management platform is provided by a Splunk Cloud, the scope of the invention is not limited to Splunk Cloud.

Public IP Bucket. According to one embodiment, the CSM system includes a public IP bucket comprising an electronic storage area that maintains a list of publicly accessible IP addresses. When a business entity configures or creates a service in the cloud, the implementation of the service may automatically generate an exposed public IP addresses that can be exploited by threat actors who are monitoring the cloud service for access points. According to an embodiment, the public IP bucket of the CSM system is configured to store IP addresses that are exposed to the Internet. The CSM system may be configured to automatically update the public IP bucket when new IP addresses are created, to update the vulnerability management platform, to update the inventory of public IP addresses in the security incident and event management (STEM) platform, and to automatically notify the relevant system administrators or security analysts of new public IP addresses. CSM monitors the API logs that are generated by the cloud provider. When specific API calls are made (e.g., API calls to AWS RunInstance or AssociateAddress, in Azure MICROSOFT.NETWORK/PUBLICIPADDRESSES/WRITE, etc.), CSM has the capability of triggering automation to perform various tasks, including but not limited to notifying administrators, updating inventories, scanning with a vulnerability management platform, removing or preventing network communication with the interface, and updating vulnerability management platform groups for scheduled scanning. The CSM system may also allow a business entity to prevent threat actors or other unauthorized users from using an IP address that has been logged in the public IP bucket by reporting on system exposure or dangerous configurations, or taking action to close the network communication path by eliminating or adjusting security group rules. In one embodiment, the CSM system may be used to automatically shut down the use of an IP address in the event the CSM system detects an anomaly or unauthorized user attempting to use such address. In addition, a copy of each log entry corresponding to each attempted access using an IP address in the public IP bucket may be stored within the account for review by a local cloud administrator. These functionalities enable an administrator of the CSM system to reduce or prevent unauthorized access to the cloud through public IP addresses by providing real time or near real time notice of public IP address creation and can be used for automatic shut down in the event of unauthorized access.

The cloud security monitoring system and method may include automated scraping of assigned public IP addresses from monitored clouds for vulnerability scanning on a periodic basis. The period for conducting the scraping may be configured in the CSM system to near real-time or less frequent, e.g., every 15 seconds or every 60 minutes. The frequent scraping can enhance security by reducing the time between creation of a new public IP address in the monitored cloud, and the time that the CSM system begins monitoring use of the new public IP address. CSM monitors the API logs that are generated by the cloud provider. When specific API calls are made, e.g., API calls to AWS RunInstance or AssociateAddress, in Azure MICROSOFT.NETWORK/PUBLICIPADDRESSES/WRITE, etc., CSM has the capability of triggering automation to perform various tasks, including but not limited to notifying administrators, updating inventories, scanning with a vulnerability management platform, removing or preventing network communication with the interface, and updating vulnerability management platform groups for scheduled scanning. The CSM method may also include automated updating of the assigned public IP addresses scraped from the monitored clouds in the vulnerability management platform.

Automated Deployment of CSM Code; Push Logs to Splunk. According to one embodiment, the cloud security monitoring system and method may include fully automated deployment of an entire cloud security monitoring stack in the monitored cloud. The CSM system and method may include automated deployment of CSM code to select or all regions served by the business, and automated deployment of the CSM code to one or more additional regions based on usage. This is accomplished via CSM monitoring the API interactions that are occurring within the cloud infrastructure. When API calls are made that originate from regions other than a region that CSM is monitoring, the system may trigger the deployment of code to additional regions where resources have been deployed to support dynamic visibility across CSP regions. A multitude of configurations can allow this to happen, for example, a template residing within a storage structure can be referenced that allows for the deployment of CSM to additional regions analogous to the initial deployment of CSM. The CSM application may comprise of software agents that can be deployed to virtual servers residing in multiple locations in the monitored clouds (e.g., multiple instances of AWS, Azure, and GCP) through the use of automation.

The CSM code may be configured to automatically push cloud alerts and logs generated in the monitored cloud to the security incident and event management (STEM) platform (e.g., Splunk Cloud). Collection of the environment's logs in the STEM platform allows the system administrator to create custom queries and alerts, which may provide real time visibility into the operation of all instances of all cloud services utilized by the business entity. The cloud security monitoring system and method may also include an automated notification to alert a system administrator when a log fails to be delivered to the STEM platform. During log processing, the CSM system in Azure is designed to process logs and provide the security incident and event management platform with the necessary metadata to be able to classify and properly store the cloud log information that is being ingested. The automation is able to do this by monitoring the log provider field within each log entry or by monitoring the CSM infrastructure that is extracting and sending the data to the security incident and event management platform (STEM). While monitoring these fields within the cloud logs, CSM may determine the source of the log and classify it for the SIEM. The automation first classifies the cloud log, retrieves the secret that is needed to authenticate and authorize the log to be ingested into the STEM, builds header information to be consumed by the SIEM aggregation technology, then combines the segregated bits of information to allow for the sending and ingestion of the cloud logs into the SIEM. In AWS, this is accomplished by leveraging a number of mechanisms; cloud log data is first aggregated in the native AWS service CloudWatch. Automation has been designed to place the correct log destination that allows for a CloudWatch Subscription Filter to be placed on the log group. Each log type receives its own log group/subscription filter and allows for the sending of logs to an AWS Logging account. Upon receiving the log, the AWS Logging account forwards the cloud log to the AWS Kinesis Data Streams service. This input mechanism is used to transfer the data from AWS CloudWatch log destinations to AWS Kinesis FireHose service for output to the STEM. As AWS Kinesis Data Stream takes data as an input, it forwards the data to the AWS Kinesis FireHose to be decompressed, possibly enriched with other data that is available within the environment, and sent to the SIEM.

Auto Configuration. According to one embodiment, the CSM system includes automatic remediation of logging configurations based on the needs defined by the consumers of the CSM cloud data. Many resources that are deployed do not have logging enabled. To facilitate the visibility of logging requirements, CSM is capable of altering the logging configuration of resources deployed within the environment. The automation is capable of leveraging the API endpoint(s) that controls the configuration of the resource. CSM issues a series of API commands that allow the configurations of targeted resources to be changed. An example of this includes an administrator deploying a load balancer to route Internet traffic for the environment's servers. CSM will take note of the newly deployed resource, evaluate its logging or compliance configuration against the defined standards, and take action by applying the needed configurations if those configurations are not in place. This allows the continued enablement of visibility with near real-time automated assessments of all resources that are in-scope for CSM to monitor.

Auto Healing. In one embodiment, cloud security monitoring may include alteration of the current configuration, automatic remediation, automatic healing, or automatic fixing of misconfigured resources that cause cloud security monitoring to fail. For example, if the monitored cloud comprises of an AWS cloud instance or deployed cloud resource, custom configuration rules and CSP-provided configuration rules may be implemented to determine whether remediation is necessary. Upon determining that the resource's configuration varies from the standard required by CSM, a series of automated corrective actions are performed to adjust the configuration to return the resource to its desired configuration and allow for visibility into the operations of the resource.

Integration of AWS functions with Lambda ($\lambda$). According to another aspect of the invention, the CSM system is able to integrate disparate and segmented cloud service providers (CSP) offerings. This is accomplished through the use of CSP serverless offerings. Custom code leverages the CSP's API endpoint(s) to make any integration possible. The serverless offerings allow for the interaction, connection, or consumption of data capable of being utilized by the CSM system. This includes, but is not limited to, collection of (system or stored) data, actions taken against the cloud environment or resources, enrichment of any data point received by CSM, or any custom logic needed by the consumer of CSM for any need (e.g., forwarding, analysis, enrichment, reporting, action, etc.). For example, load balancers are typically deployed with a configuration that does not provide visibility that supports information technology teams with understanding of how the resource operates, the data it receives, the network communications that it is forwarding, or the clients that it is servicing. This may hinder the ability for the resource to be understood from an operational or security perspective. Access logs of this resource are sought to perform analysis such as user interactions, operating system interactions, browser user agents, IP address interactions, data usage, etc. To support the needed visibility and lack of direct integration, CSM may pair varying services together that as a whole allow for the transmission of cloud data to the necessary system of choice (e.g., vulnerability management platform, security incident and event management platform, security orchestration and automated response platform, security incident management platform, ticketing system, inventory system, etc.).

ID and Asset Scraping. According to another embodiment, the CSM system and method may include an identity and asset scraper functionality that collects information on users, service accounts, and cloud resources of the business entity. The cloud service providers (CSP) API endpoint(s) is leveraged to query for the needed inventory information. This data, when combined with the cloud logs in the security incident and event management (SIEM) platform, allows the CSM system to provide a more comprehensive and insightful analysis of the use of the cloud services by allowing: an understanding of cloud resources, correlation of logs against an inventory of assets, remediation based on asset or identity information, precise identification of assets or identities within alerts, etc.

Self-Monitoring. According to another embodiment, the solution is designed to monitor the security posture of its own components by monitoring IaaS and PaaS offerings in multiple cloud service provider platforms. CSM itself makes use of PaaS offerings to move and transform log records on their journey to the final destination. The same mechanisms (e.g., audit logs, anomaly detection, configuration monitoring, etc.) that are used to monitor a Member account, are applied to the solutions support infrastructure. This allows a security team to monitor the health of CSM and detect anomalous behavior by its varying components.

SIEM of SIEMs. According to another embodiment, the CSM solution is designed to be the SIEM of SIEMs. This allows environment administrators the flexibility to use the technology of their own choosing for log analysis, while still allowing CSM to provide the required visibility into the alerts generated by any STEM technology, including those deployed natively by the cloud providers. The method of capture makes use of API endpoints assigned to service the monitored native cloud provider STEM. Specifically, the method of security alert collection for a vendor or cloud provider STEM is performed by: (1) requesting an access token from an Identity provider (IdP), (2) using the access token to request a bearer token, and (3) using the bearer token to query workspace that STEM is using for any alerts generated in a configurable time period. This flexibility allows the CSM solution to be the top tier STEM in a hierarchical topology of STEM deployments.

Port Identification. According to another embodiment, the CSM system provides monitoring of selected ports associated with an IP address. In general, an IP address may have thousands of ports associated with it. In addition, certain cloud providers such as AWS may monitor and prevent automated crawling of ports by third-party software agents that interact with all ports associated with an IP address. In order to facilitate the monitoring of selected ports without using a crawling agent, the CSM system may be programmed to detect, store and retrieve the ports that are used in connection with an IP address. This is done by querying the varying cloud service provider (CSP) API endpoint(s) to determine the exact port information that is needed. Having this information allows the CSM system to monitor the active ports without using a crawling agent to monitor all ports, which would normally be prevented by AWS or other intelligent response capabilities offered by default to CSP customers. The CSM system may also provide detection of crawling of ports used by threat actors and take corrective actions to remediate it (e.g. by temporarily shutting affected ports down, preventing access from specific IP addresses etc.).

Throughput Adjustment. In an embodiment, cloud security monitoring may include automatic adjustment of throughput between the Logging account, which may reside in the monitored cloud, such as AWS or Azure cloud, and the STEM platform, such as Splunk Cloud, to address service thresholds. To accomplish this, the automation monitors the processing of logs of the service (AWS Kinesis FireHose) and when an event is encountered with an entry stating WriteProvisionedThroughputExceeded the automation increments the number of shards assigned to the AWS Kinesis FireHose output stream. Adjusting the number of shards assigned to each stream allows for the throughput to be expanded or contracted on a per log type basis. When the cloud log does not contain the aforementioned entry for a configurable amount of time, the automation may decrement the number of shards assigned to each stream. Doing so reduces the costs of maintaining multiple shards that are not being used to process cloud data.

Auto-updating. The CSM system that runs in AWS has the ability to self-update the CSM code that is running within the cloud environment. The feature leverages a series of serverless functions and CI/CD pipelines that allow CSM to monitor a specific file that is held within a storage structure accessible by CSM. The automation monitors a file on a configurable interval for changes to the MD5 hash value which indicates that a new version is available. The automation then makes a copy of the needed deployment templates, triggers the necessary deployment mechanisms (e.g., AWS CloudFormation), and monitors for the status of the deployment. Additional automation may be triggered to identify issues and failures encountered during deployment.

Agent deployment. In another embodiment, CSM has the capability of deploying security agents to servers with automation. This is accomplished through native services in each CSP (e.g., Azure custom script extensions, AWS System manager automation documents, etc.). Each Member account that has integrated CSM with the environment is made available the automation documents to:
1. Test if the agent is installed,
2. If the agent is not installed and running, the code
   2.1. Gathers the security agent installation package from the appropriate storage structure, 2.2. Installs the agent using the pre-configured installation commands, and 2.3. Reports back to the administrator any successes or failures.

This automation applies to various operating systems (e.g. Linux, Windows).

The CSM system that runs in AWS also has the ability to rotate all authentication tokens in use by the Logging account across all regions. To accomplish this, the CSM system monitors for changes to the AWS System Manager parameter store that contains the security incident and event management (SIEM) platform authentication tokens. When changes to the AWS System Manager parameter store are noted by CSM, automation (e.g., AWS Lambda) is triggered that collects the values of the tokens, identifies the AWS Kinesis FireHose stream that should use the token, and updates the value used by the AWS Kinesis FireHose stream. Upon updating this token, the stream begins to utilize the updated token. This provides IT teams the ability to update authentication tokens in one place, and have those tokens propagate across corresponding logging output mechanisms.

Referring now to the drawings, FIG. 1 illustrates an example of a cloud security monitoring system with multiple Member accounts in AWS cloud. According to one embodiment, for each Member account, such as Member Account 1, a Logging account and a Security account are provided. The Member account may include a public IP scraper to perform automated scraping of assigned public IP addresses from monitored clouds. Automated updating of the assigned public IP addresses scraped from the monitored clouds may be performed in a vulnerability management platform, such as Qualys. All scrapping and updating of the information is accomplished over the platforms API. Vulnerability scanning may be performed on a periodic basis at a desired frequency, upon the occurrence of certain events, or on demand by a system administrator, for example.

According to one embodiment, built-in automated updating of HTTP Event Collector (HEC) tokens used to authenticate the logs in Splunk Cloud may be provided by the HEC update Lambda (λ) function in the Logging account. Notifications to alert administrators of log failures may be delivered by the Logging account to Splunk Cloud. Alert notifications may be processed and presented in a format readable by humans. Automatic adjustment of throughput between the Logging account and Splunk Cloud may be provided to address and satisfy a service threshold. Automated deployment of CSM code to all existing regions, and into additional regions based on usage, may be provided.

Figure 2:
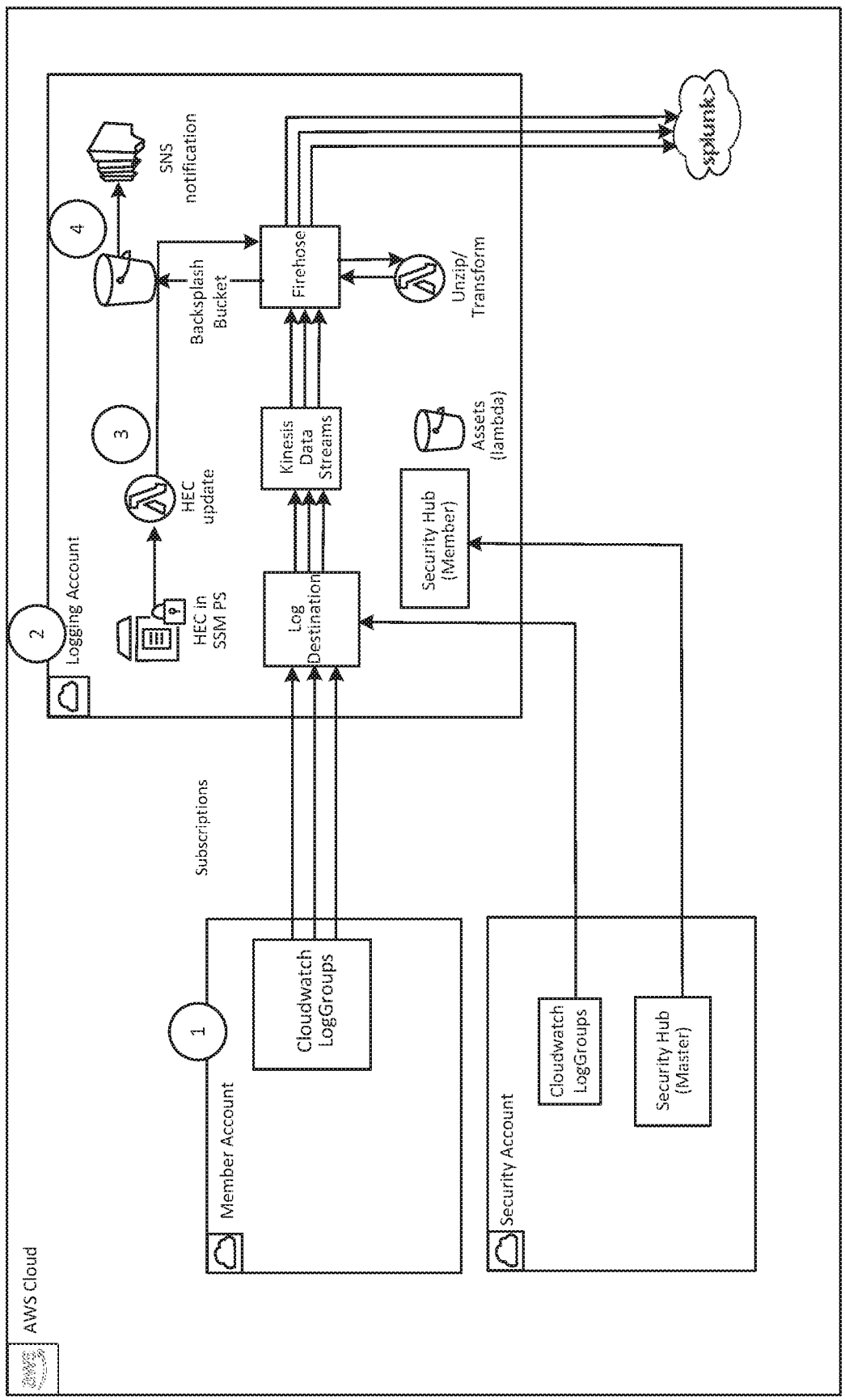
FIG. 2 illustrates an example of a cloud security monitoring system in AWS cloud having a Member account, a Security account, and a Logging account with a log flow path to Splunk Cloud according to an embodiment of the invention.

FIG. 2 illustrates an example of cloud security monitoring in AWS cloud having a Member account, a Security account, and a Logging account with a log flow path to Splunk Cloud. The Member account may include CloudWatch LogGroups and the Security account may include CloudWatch LogGroups and Security Hub (Master). The Logging account may provide a log flow path to Splunk Cloud. The Logging account is provided between the monitored cloud and Splunk Cloud to prevent administrators or hackers from tampering with or deleting the logs. In one embodiment, automated updating of HEC tokens used for authentication in Splunk Cloud may include automated rotation of HEC tokens, which may be performed by the HEC update Lambda (λ) function in the Logging account.

Figure 3:
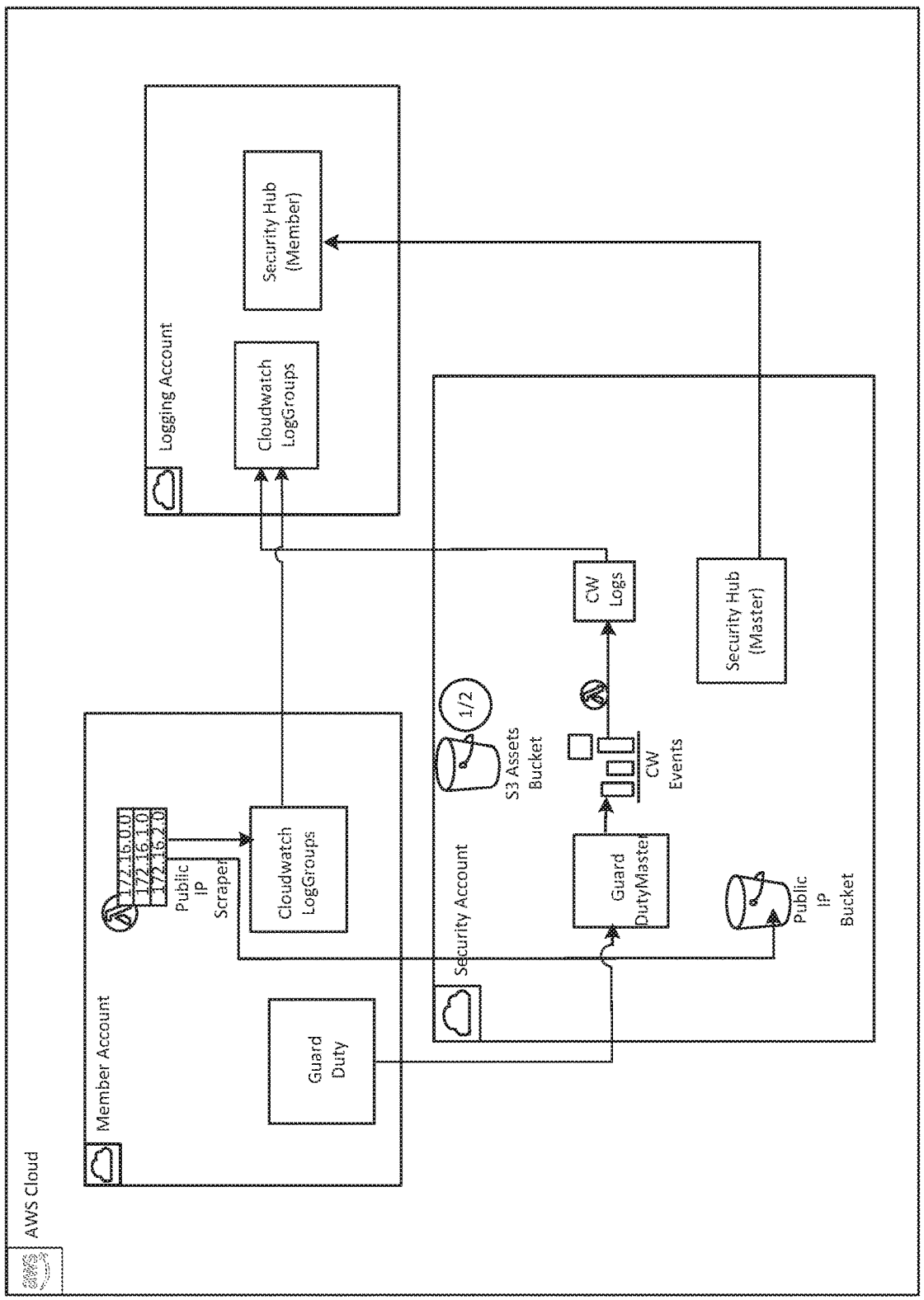
FIG. 3 illustrates an example of a cloud security monitoring system in AWS cloud having a Member account, a Security account, and a Logging account, where the Security account includes a public IP bucket, according to an embodiment of the invention.

FIG. 3 illustrates an example of cloud security monitoring in AWS cloud having a Member account, a Security account, and a Logging account, where the Security account includes a public IP bucket and an AWS S3 assets bucket. Endpoint agents may be staged in the S3 assets bucket in the Security account and automatically deployed to servers in the Member accounts. A public IP scraper, which may be a Lambda (λ) function, may be provided in the Member account. Automated updating of the assigned public IP addresses scraped from monitored clouds may be provided.

Figure 4:
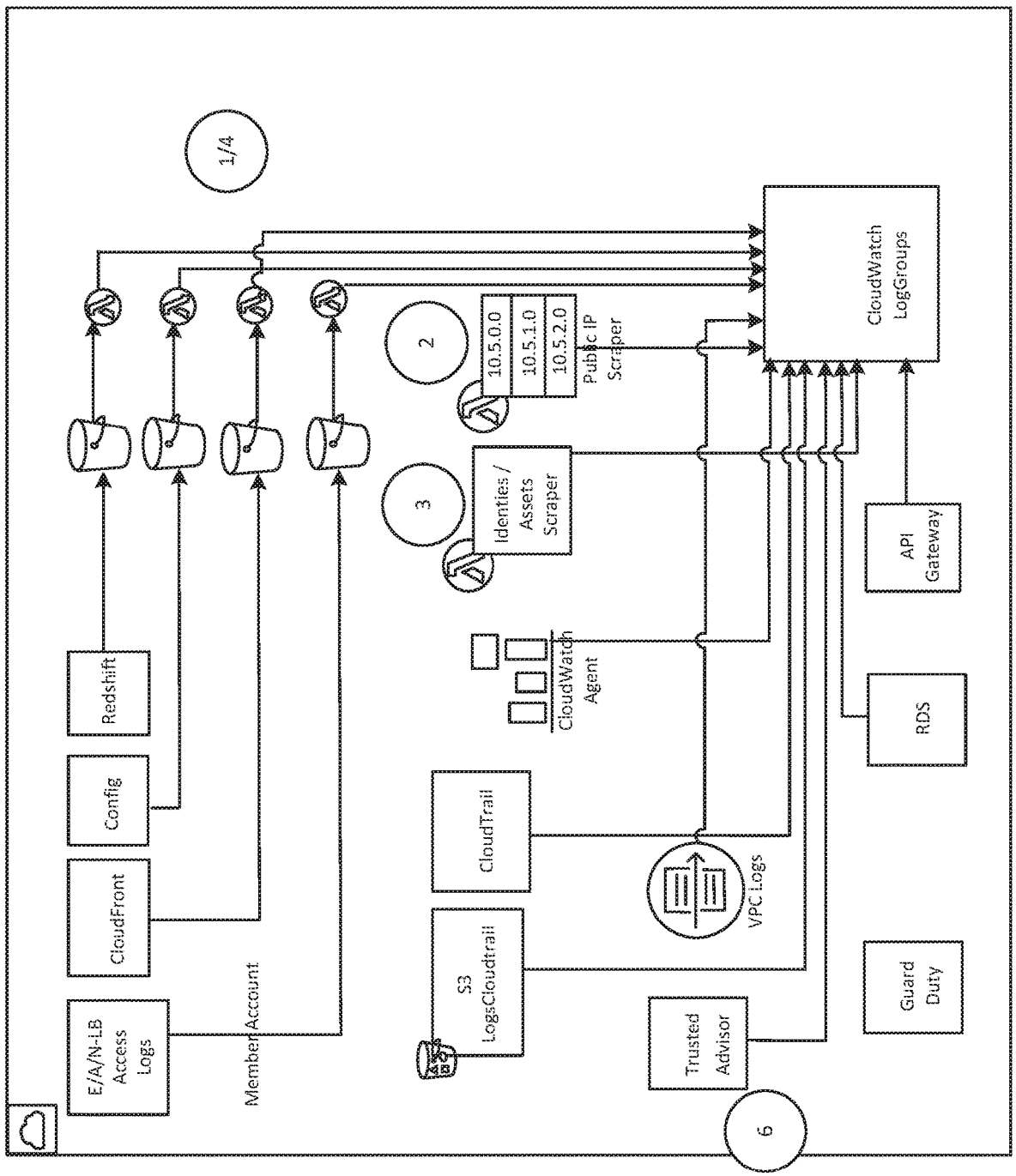
FIG. 4 illustrates an example of cloud security monitoring in AWS cloud having a Member account which includes a public IP scraper and an identities/assets scraper according to an embodiment of the invention.

FIG. 4 illustrates an example of cloud security monitoring in AWS cloud having a Member account which includes a public IP scraper and an identities/assets scraper. In one embodiment, CSM code implemented through a Lambda (λ) function may be provided to extract log messages from the S3 buckets and to push them to CloudWatch, such that a copy of each log entry is maintained for a local cloud administrator. The public IP scraper may be programmed to automatically gather needed information from each service with public IP addresses assigned, regardless of whether those IP addresses are exposed to the internet or not.

According to one embodiment, all identities of individuals and IT assets or resources may be automatically collected within a monitored cloud by the identities/assets scraper and may be automatically inventoried. In addition, cloud misconfiguration assessments generated by the AWS Trusted Advisor in the Member account may be automatically gathered. Automatic remediation, automatic healing or automatic fixing of misconfigured resources that cause CSM to fail may be provided, which will be described in further detail with respect to FIG. 6. According to one embodiment, logs may be collected from virtual appliances in the same manner as the collection of logs in conventional data centers.

Figure 5:
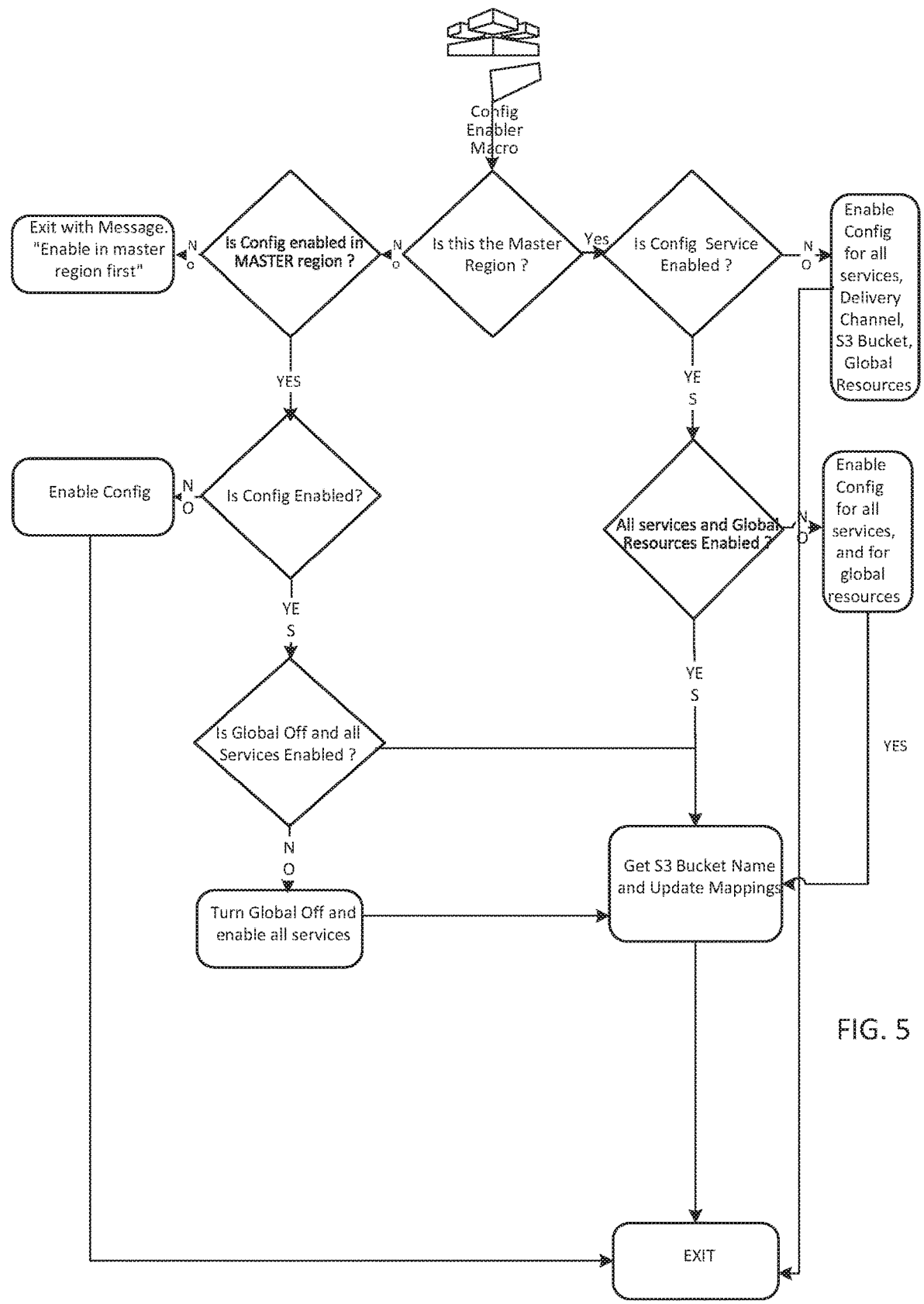
FIG. 5 illustrates an example of a process for cloud security monitoring in AWS cloud according to an embodiment of the invention.

FIG. 5 illustrates an example of the deployment of the AWS Config service. AWS Config provides resource information that CSM consumes. In order to properly deploy the AWS Config service, a series of steps that are dependent upon information from previous steps are needed. In order to accomplish a successful deployment, CSM follows the logic described in FIG. 5. The automation is designed to intelligently determine the needed configurations to ensure a successful deployment. Information that is gathered includes analysis of the region that is designated as the "master region" or the main operating region where AWS global resources are deployed, if a previous AWS Config service instance is deployed, and reports back to the administrator any issues that are encountered during the deployment. Upon successful deployment of the service, a number of managed and customized rule sets are deployed to accomplish any monitoring needs that span security, compliance, inventory, operational, or other needs.

Figure 6:
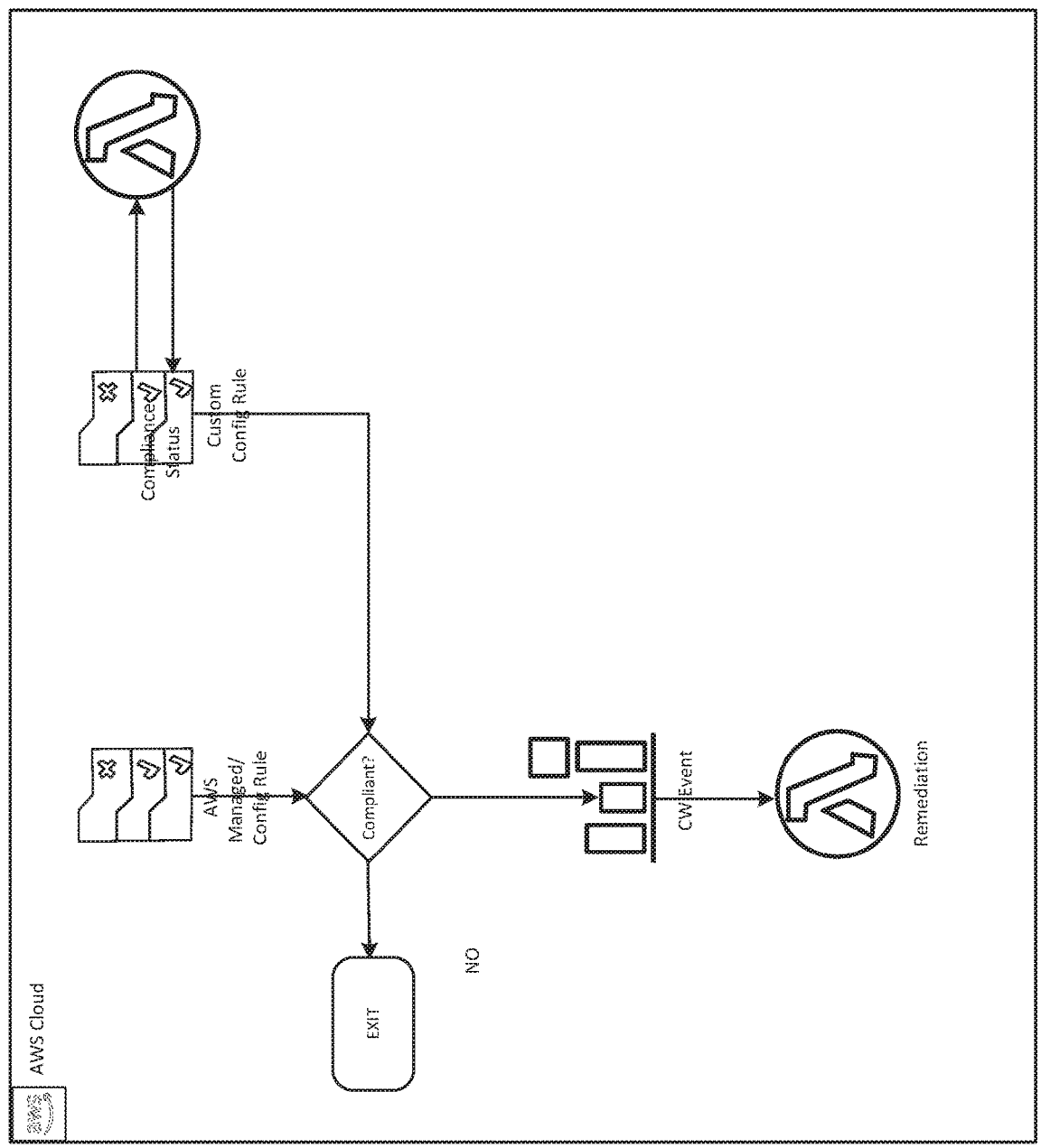
FIG. 6 illustrates an example of a process for cloud security monitoring in AWS cloud with automatic remediation, automatic healing or automatic fixing of misconfigured resources according to an embodiment of the invention.

FIG. 6 illustrates an example of a process for cloud security monitoring in AWS cloud with automatic remediation, automatic healing or automatic fixing of misconfigured resources. According to one embodiment, AWS managed configuration rules and custom configuration rules may be provided. A Lambda (λ) function may be implemented in conjunction with the custom configuration rules to determine compliance status. The custom configuration rules and AWS managed configuration rules may be used to determine whether the resources are CSM compliant. If they are compliant, then the process ends. If they are not, then a CloudWatch event is initiated, and automatic remediation, automatic healing or automatic fixing of misconfigured resources that cause CSM to fail may be performed by a Lambda (λ) function for remediation.

Figure 7:
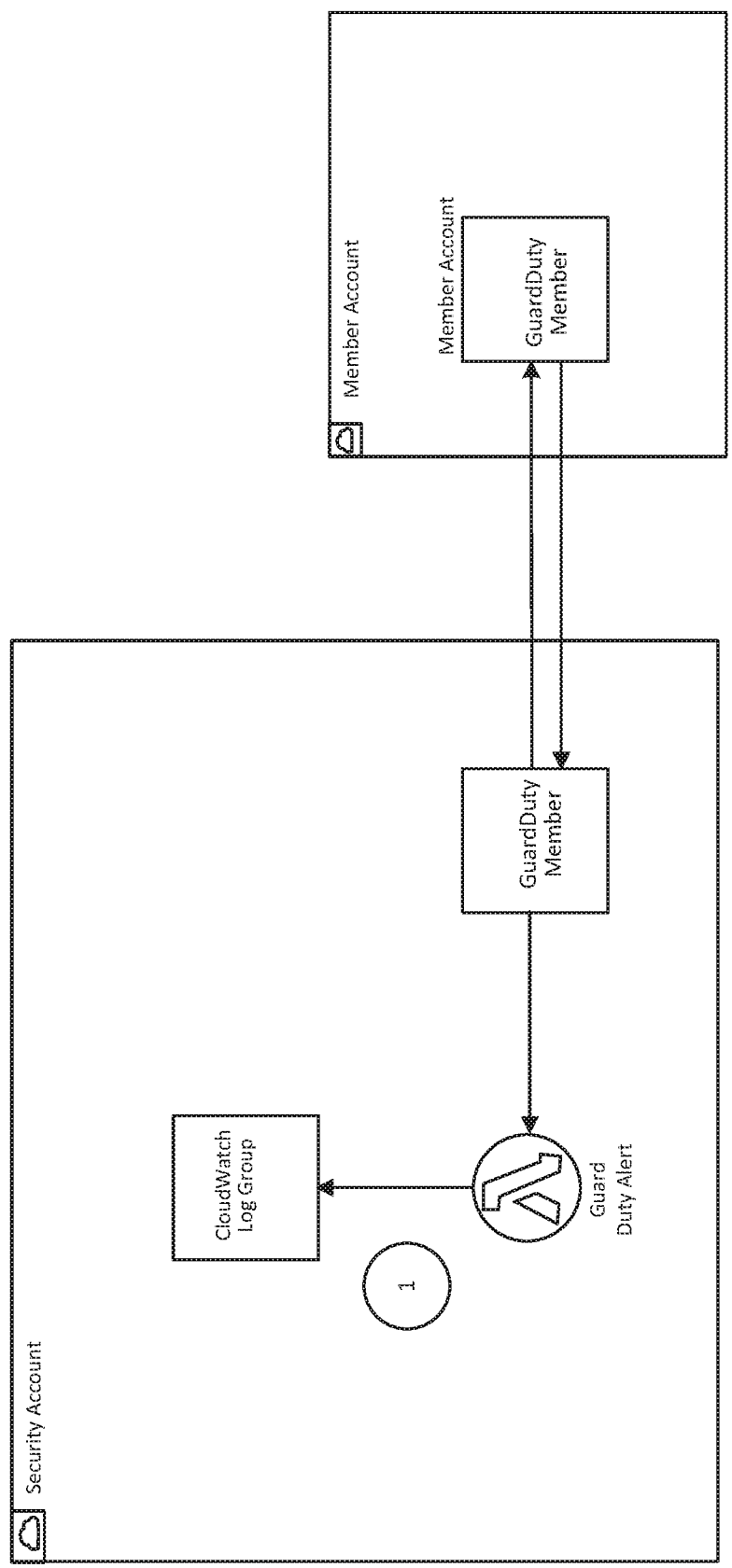
FIG. 7 illustrates an example of cloud security monitoring in AWS cloud with Guard Duty alert flow between a Member account and a Security account according to an embodiment of the invention.

FIG. 7 illustrates an example of cloud security monitoring in AWS cloud with AWS Guard Duty alert flow between a Member account and a Security account. In one embodiment, the Security account may include CloudWatch Log Group, Guard Duty Alert, and Guard Duty Master. The Member account may include Guard Duty Member. Alert information may be automatically generated and pushed into CloudWatch. Data enrichment based on the alert information (i.e., additional information) may be appended to the alert, depending upon the type of condition that would trigger the need for additional information.

Figure 8:
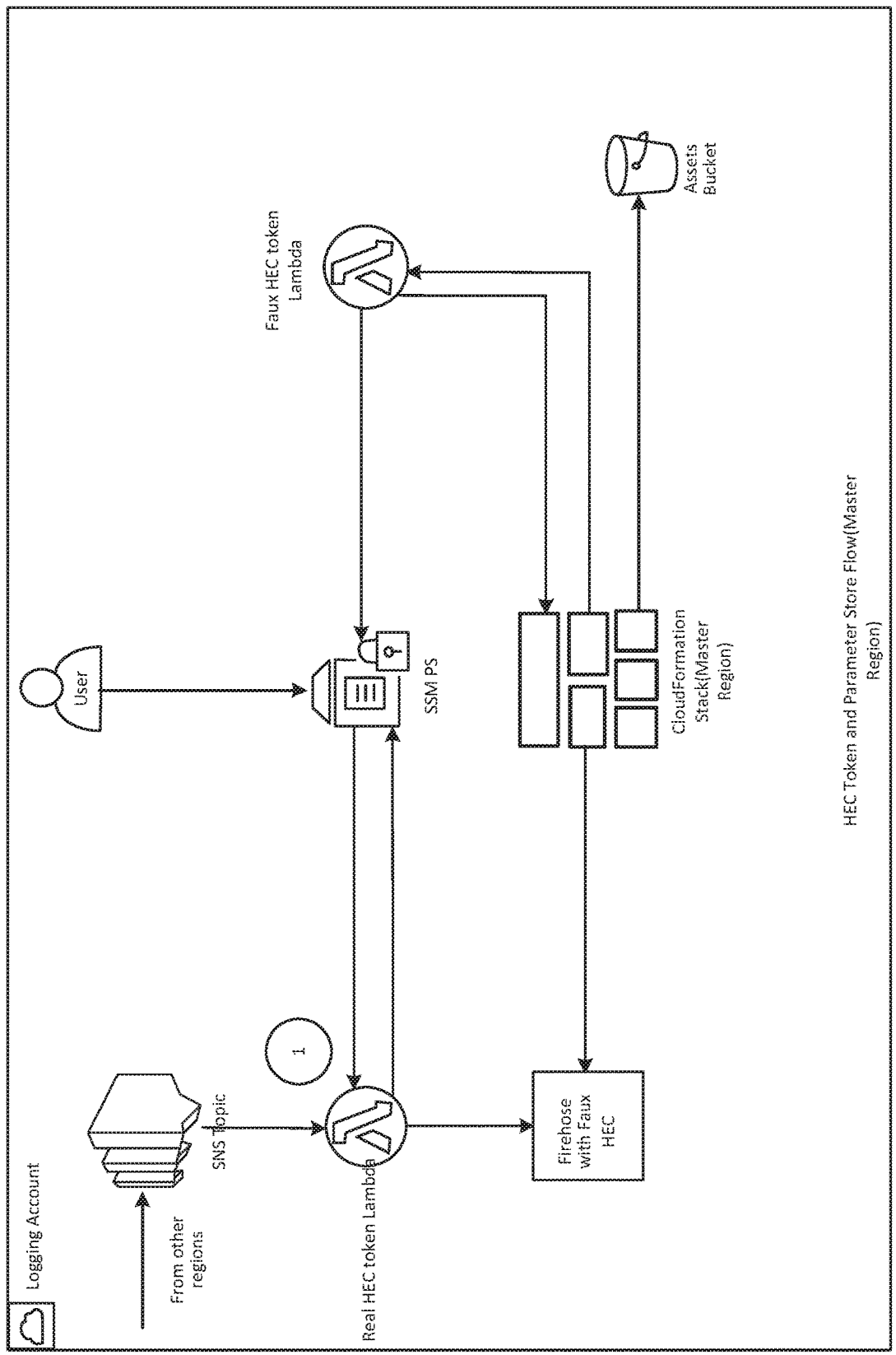
FIG. 8 illustrates an example of cloud security monitoring in AWS cloud with automated rotation of HTTP Event Collector (HEC) tokens in a master region according to an embodiment of the invention.

FIG. 8 illustrates an example of cloud security monitoring in AWS cloud with automated rotation of HEC tokens in the master region. Amazon Simple Notification Service (SNS) topics are gathered from other regions. An Amazon SNS topic is a logical access point which acts as a communication channel. An SNS topic allows a user to group multiple endpoints, such as AWS Lambda ($\lambda$), Amazon SQS, HTTP/S, or an email address. A real HEC token Lambda ($\lambda$) function, an SSM PS (AWS Systems Manager Parameter Store), a faux HEC token Lambda ($\lambda$) function, an AWS Kinesis FireHose with faux HEC, a CloudFormation stack (master region), and an assets bucket are implemented to provide built-in automated updating or automated rotation of HEC tokens used to authenticate the Logging account in Splunk Cloud.

Figure 9:
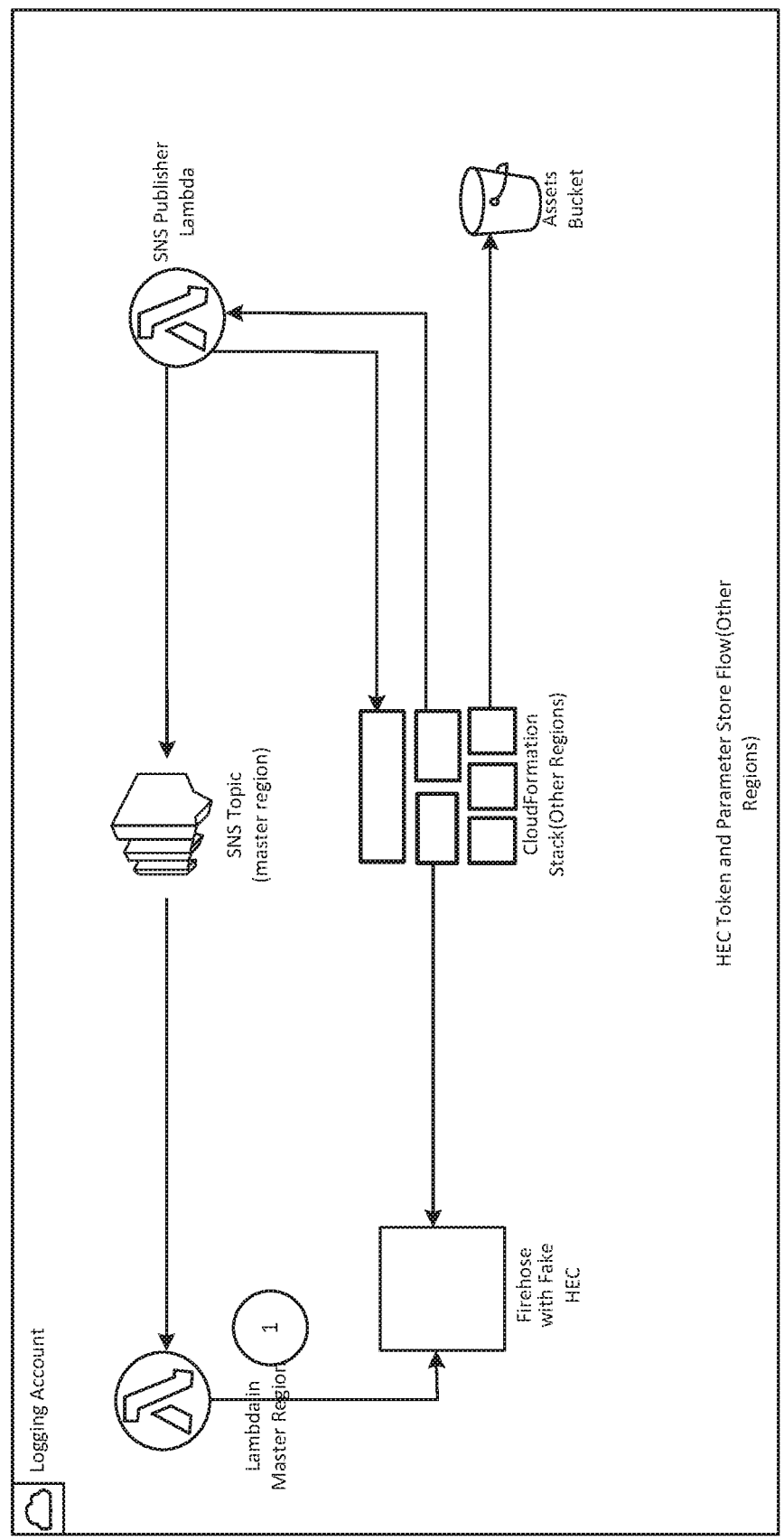
FIG. 9 illustrates an example of cloud security monitoring in AWS cloud with automated rotation of HEC tokens in other regions according to an embodiment of the invention.

FIG. 9 illustrates an example of cloud security monitoring in AWS cloud with automated rotation of HEC tokens in other regions. In one embodiment, a Lambda ($\lambda$) function in the master region, an SNS topic in the master region, an SNS publisher Lambda ($\lambda$) function, an AWS Kinesis FireHose with fake HEC, a CloudFormation stack (other regions), and an assets bucket are implemented to provide built-in automated updating or automated rotation of HEC tokens used to authenticate the Logging account in Splunk Cloud. In an embodiment, automated updating or automated rotation of HEC tokens across all regions in which CSM is deployed may be performed in the same manner.

Figure 10:
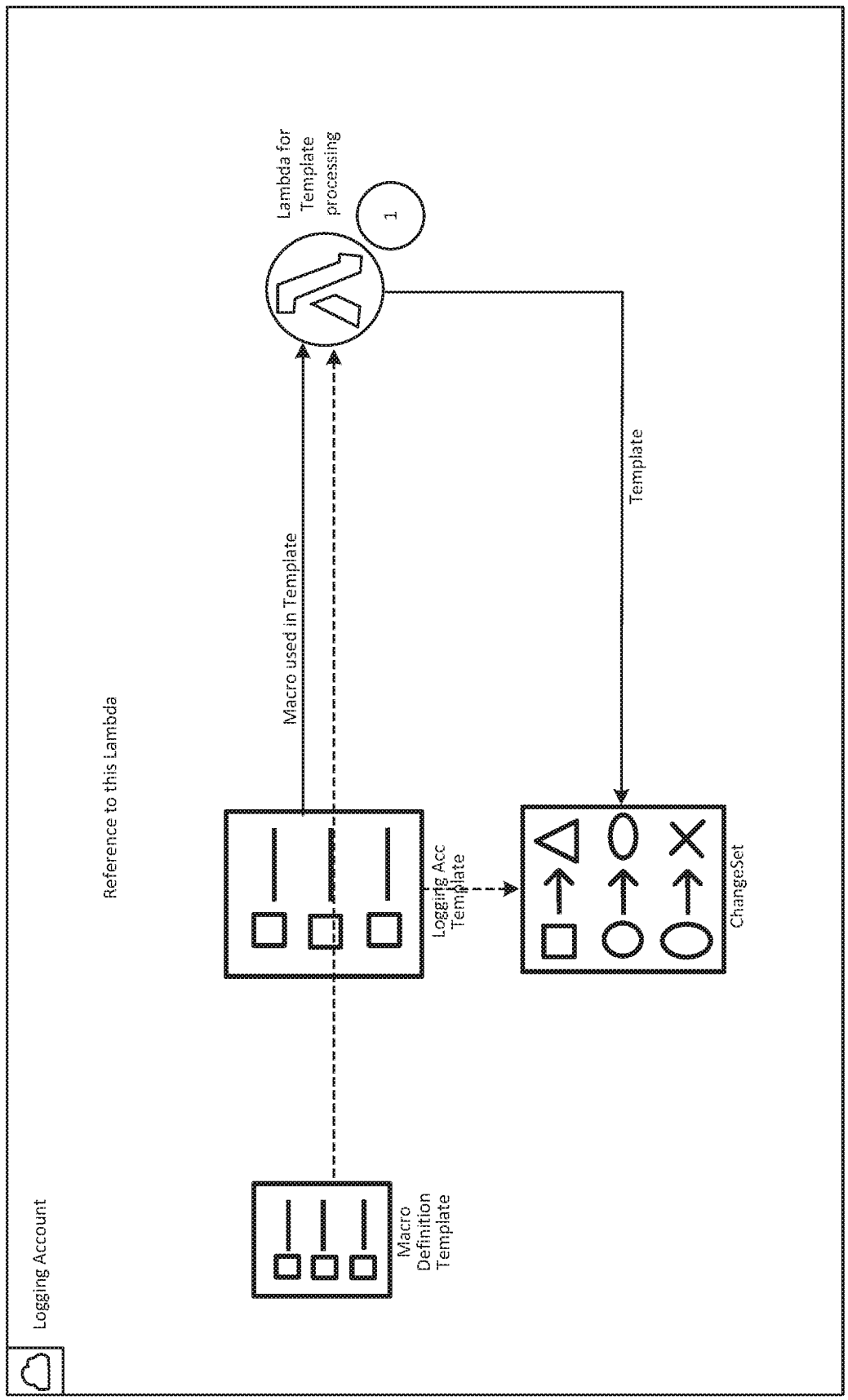
FIG. 10 illustrates an example of cloud security monitoring in AWS cloud with automated template processing according to an embodiment of the invention.

FIG. 10 illustrates an example of cloud security monitoring in AWS cloud with automated template processing. In one embodiment, a macro definition template, a Logging account template, a Lambda ($\lambda$) function for template processing, and a change set may be provided in the Logging account for template processing. A macro may be created by an AWS Lambda ($\lambda$) function which performs the template processing. The Lambda ($\lambda$) function may accept either a snippet or an entire template, and any additional parameters that may be defined by the user. The Lambda ($\lambda$) function may return either the processed template snippet or the entire processed template as a response. The macro may reproduce and modify the code based on need to allow the user to maintain a small code sample that can multiply and modify itself a number of times. In other words, the code sample may be cloned with slight mutations.

Figure 11:
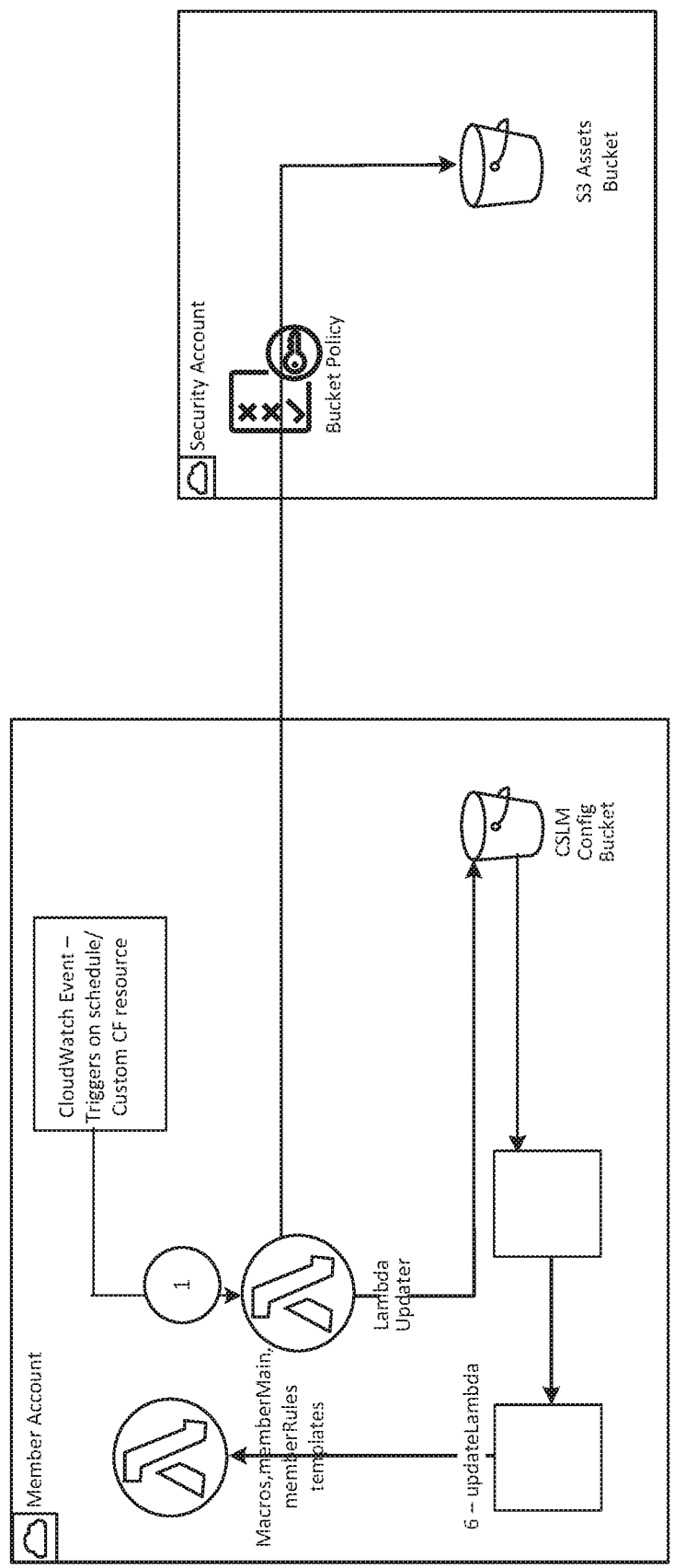
FIG. 11 illustrates an example of cloud security monitoring in AWS cloud with an auto-updater in an example of a commercial application according to an embodiment of the invention.

FIG. 11 illustrates an example of cloud security monitoring in AWS cloud with an auto-updater in an example of a commercial application. According to one embodiment, a Lambda ($\lambda$) function for macros, member information, member rules and templates, a Lambda ($\lambda$) updater, a CloudWatch event trigger, and a configuration bucket may be provided in the Member account. A bucket policy and S3 assets bucket may be provided in the Security account. Automated updating of CSM code may be performed by the Lambda ($\lambda$) updater which retrieves code updates from the Security account and deploys updated CSM code within the monitored cloud at a configurable time.

Figure 12:
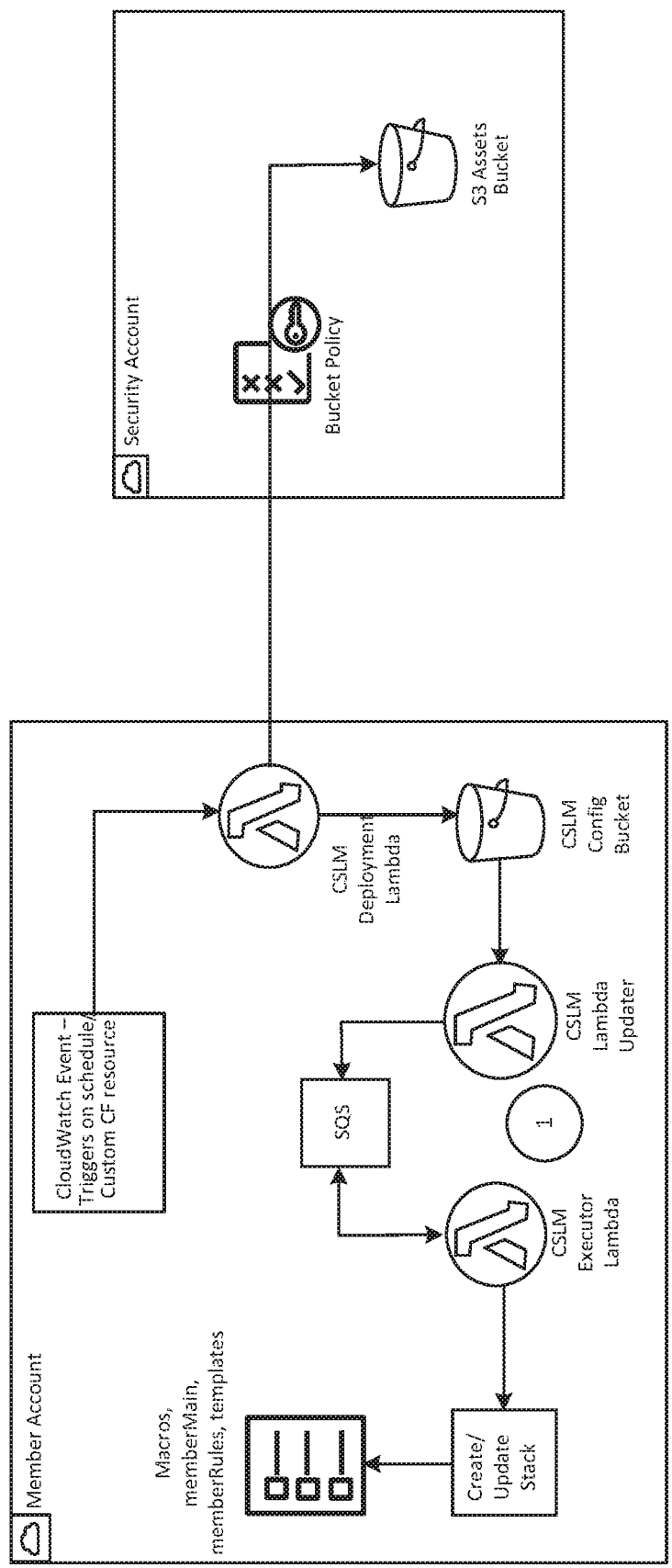
FIG. 12 illustrates an example of cloud security monitoring in AWS cloud with an auto-updater in an example of a government application according to an embodiment of the invention.

FIG. 12 illustrates an example of cloud security monitoring in AWS cloud with an auto-updater in an example of a government application. According to one embodiment, macros, member information, member rules and templates, a create/update stack, an executor Lambda ($\lambda$) function, a Lambda ($\lambda$) updater, a deployment Lambda ($\lambda$) function, a CloudWatch event trigger, and a configuration bucket may be provided in the Member account. A bucket policy and S3 assets bucket may be provided in the Security account. Automated updating of CSM code may be performed by the Lambda ($\lambda$) updater which retrieves code updates from the Security account and deploys updated CSM code within the monitored cloud at a configurable time interval.

Figure 13:
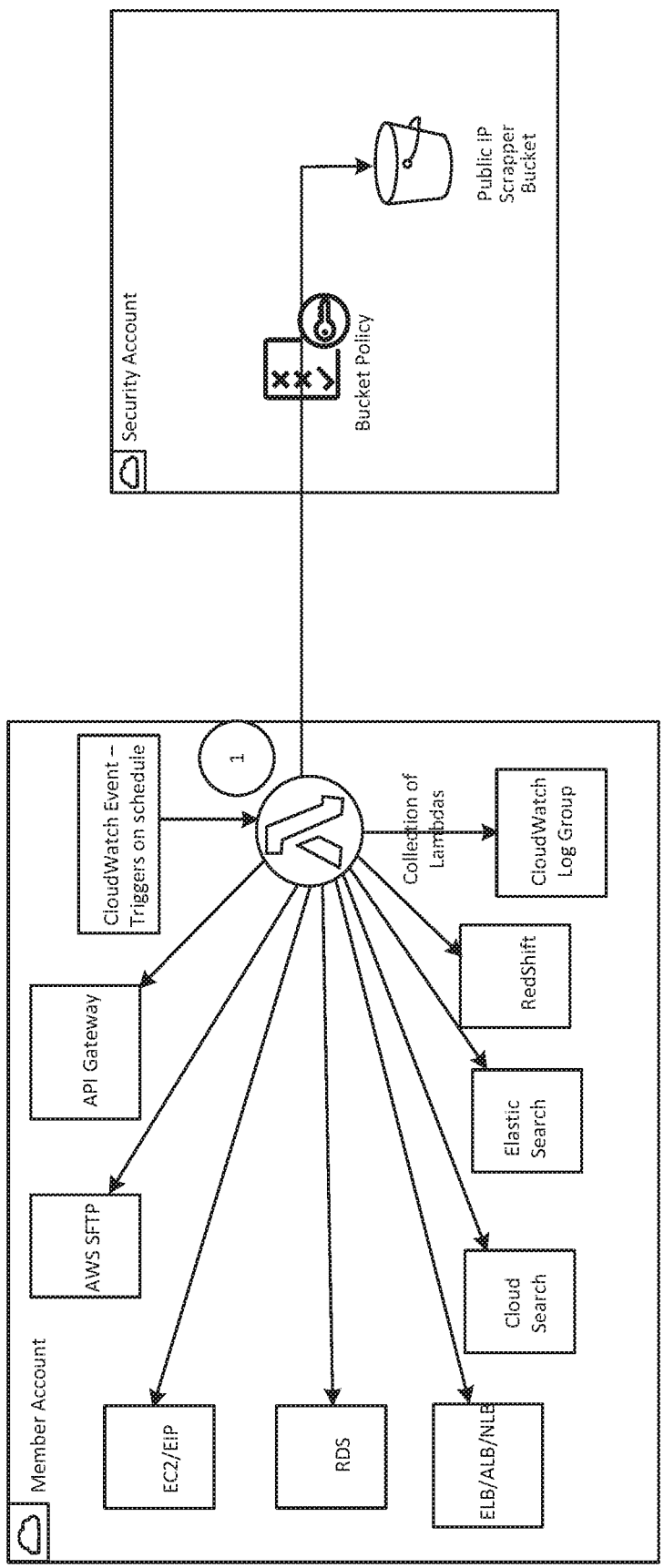
FIG. 13 illustrates an example of cloud security monitoring in AWS cloud with a public IP scraper according to an embodiment of the invention.

FIG. 13 illustrates an example of cloud security monitoring in AWS cloud with a public IP scraper. In one embodiment, a collection of Lambda modules may be provided as a Lambda ($\lambda$) function, which may be triggered by a CloudWatch event trigger on schedule in the Member account. A bucket policy and S3 assets bucket may be provided in the Security account. Automated collection of public IP scraper functions may be performed to gather needed information from each service with public IP addresses assigned, regardless of whether such public IP addresses are exposed to the internet or not.

Figure 14:
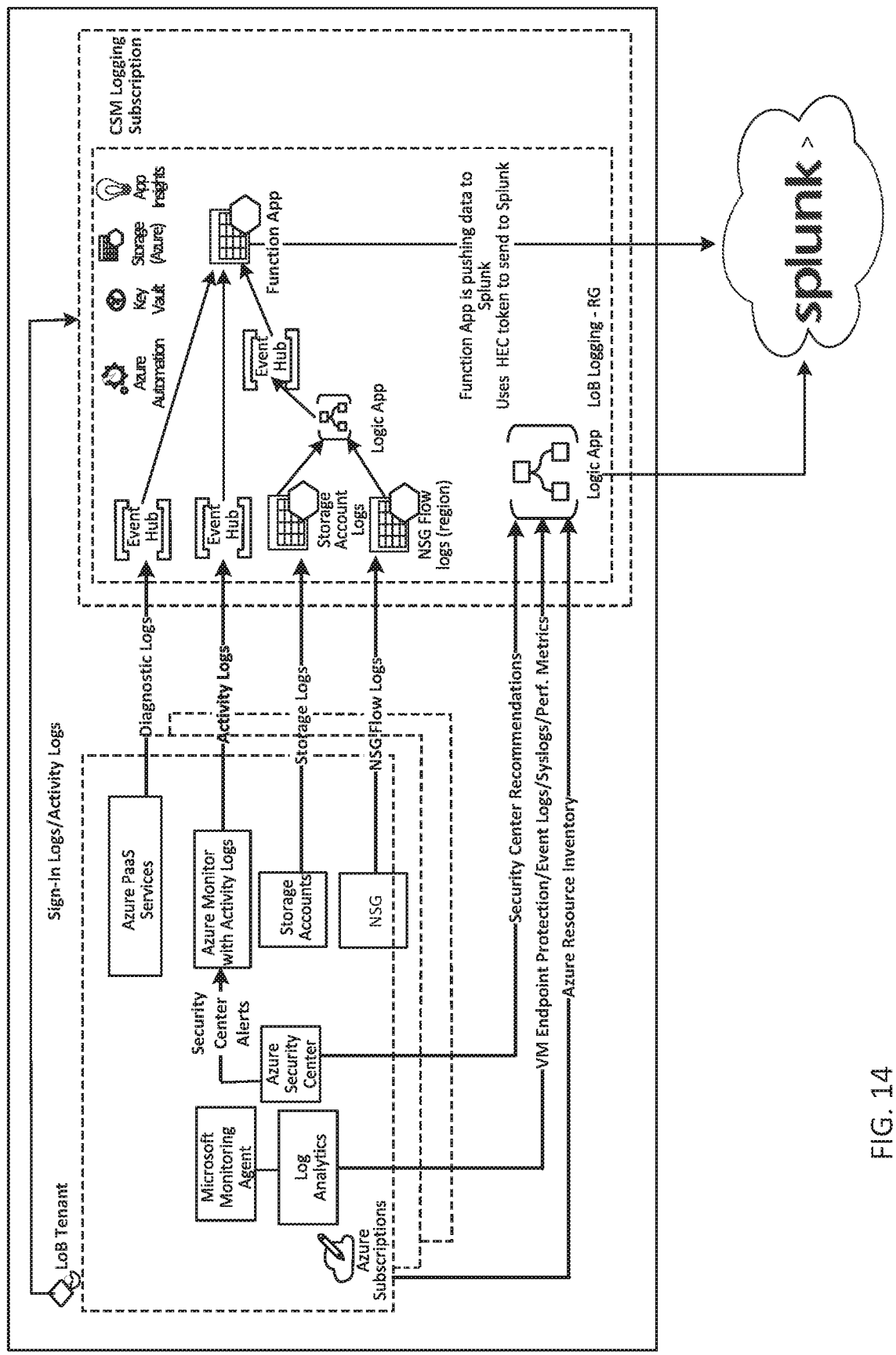
FIG. 14 illustrates an example of cloud security monitoring in Azure cloud according to an embodiment of the invention.

FIG. 14 illustrates an example of cloud security monitoring in Microsoft Azure cloud. According to one embodiment, fully automated deployment of the entire CSM stack may be provided in Azure. Sourcetype and index stamping may be provided during log processing. Automated scraping of assigned public IP addresses from all monitored clouds and vulnerability scanning on a periodic basis may be provided. Built-in notifications may be provided to alert administrators when logs fail to be delivered to Splunk Cloud. Custom policies may be implemented to assess Azure resources for compliance or needed CSM configurations.

Automated updating of the assigned public IP addresses scraped from the monitored clouds in the vulnerability management platform may be provided. Automatic adjustment of throughput between the Logging account and Splunk Cloud to address service thresholds may be provided. Automated deployment of CSM code into additional regions based on usage may be provided. Automatic remediation, automatic healing or automatic fixing of misconfigured resources may be provided using Azure policies with a DeployIfNotExists configuration.

Figure 15:
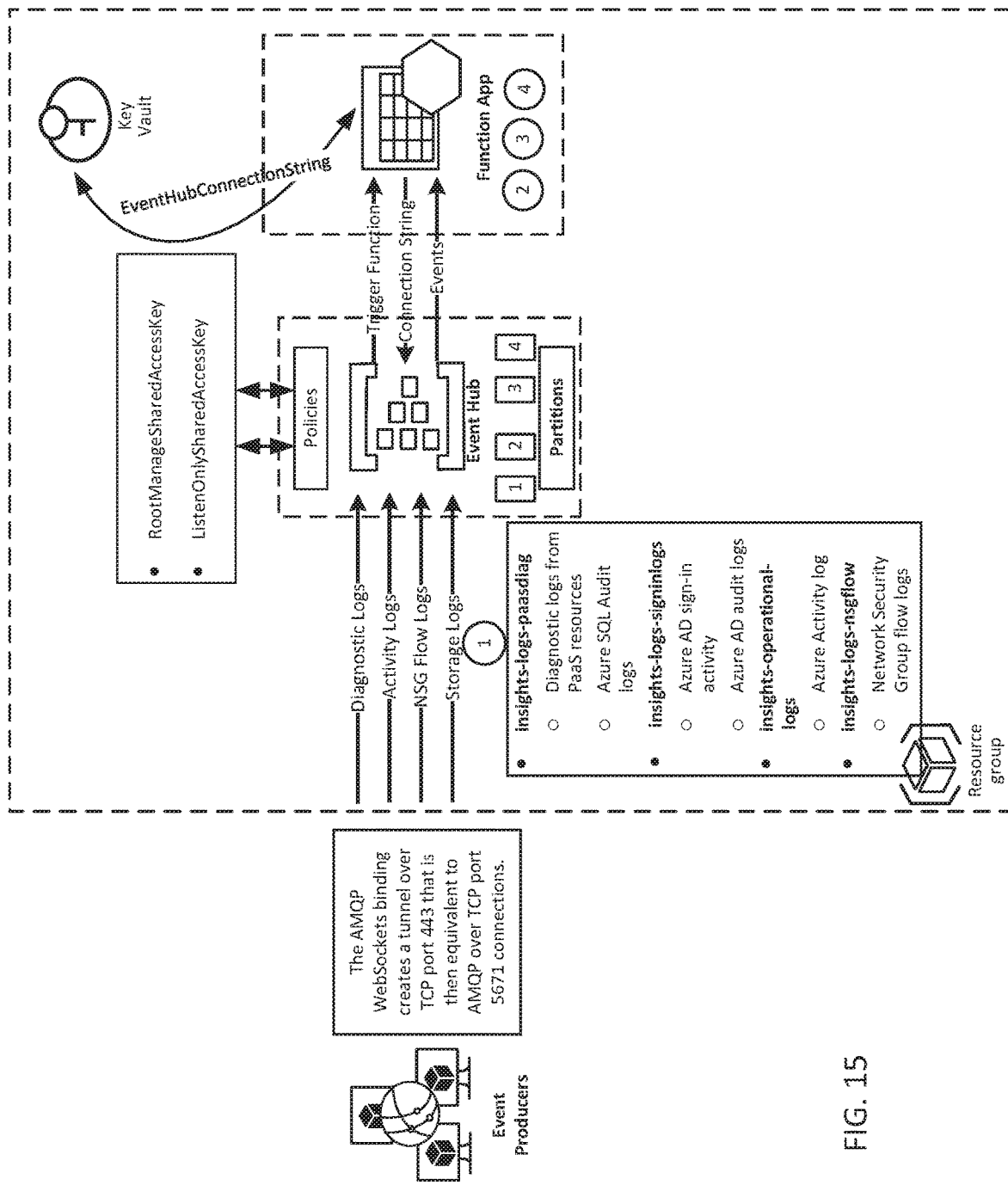
FIG. 15 illustrates an example of cloud security monitoring in Azure cloud with a Logging subscription according to an embodiment of the invention.

FIG. 15 illustrates an example of cloud security monitoring in Azure cloud with a Logging subscription. In one embodiment, NSG (Network Security Group) flow logs and store logs may be automatically enabled. An Azure function may be provided to retrieve logs from an Event Hub via custom-built code. The function application may process and enrich log data based on the logs retrieved from the event hub. A secure connection may be established to push the processed log data into Splunk Cloud.

Figure 16:
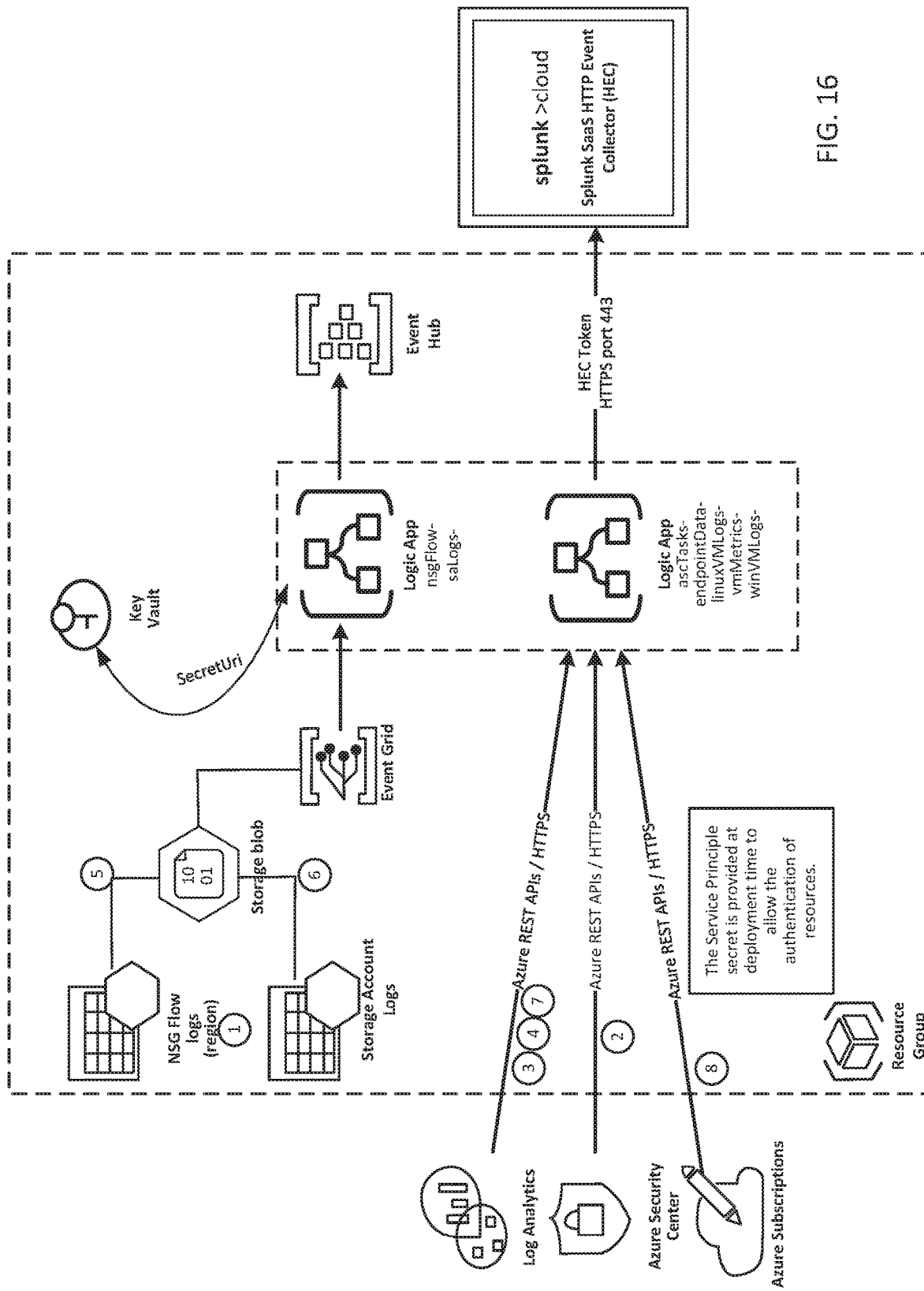
FIG. 16 illustrates an example of cloud security monitoring in Azure cloud with a HEC token flow to a Splunk Cloud according to an embodiment of the invention.

FIG. 16 illustrates an example of cloud security monitoring in Azure cloud with a HEC token flow to Splunk Cloud. In one embodiment, for log sources that do not integrate directly with the event hub, logic applications may be provided to facilitate the logging and monitoring of those sources. Azure Logic Apps may be provided to scrape Azure Security Center alerts and forward them to Splunk Cloud. A logic application may be provided to scrape anti-virus and other endpoint security alerts from Windows VMs (Virtual Machines) and send them to Splunk Cloud. A logic application may be provided to scrape Syslog (system log) and Auth Logs (authentication logs) from Linux VMs and send them to Splunk Cloud.

According to one embodiment, a logic application may be provided to scrape NSG flow logs from all subscriptions and send them to Splunk Cloud if Microsoft native integration is not available. A logic application may be provided to scrape all storage access logs and push them to Splunk Cloud. A logic application may be provided to scrape all VM metrics data and send them to Splunk Cloud. A logic application may be provided to scrape system, application, and security logs from all Windows VMs and send them to Splunk Cloud.

Figure 17:
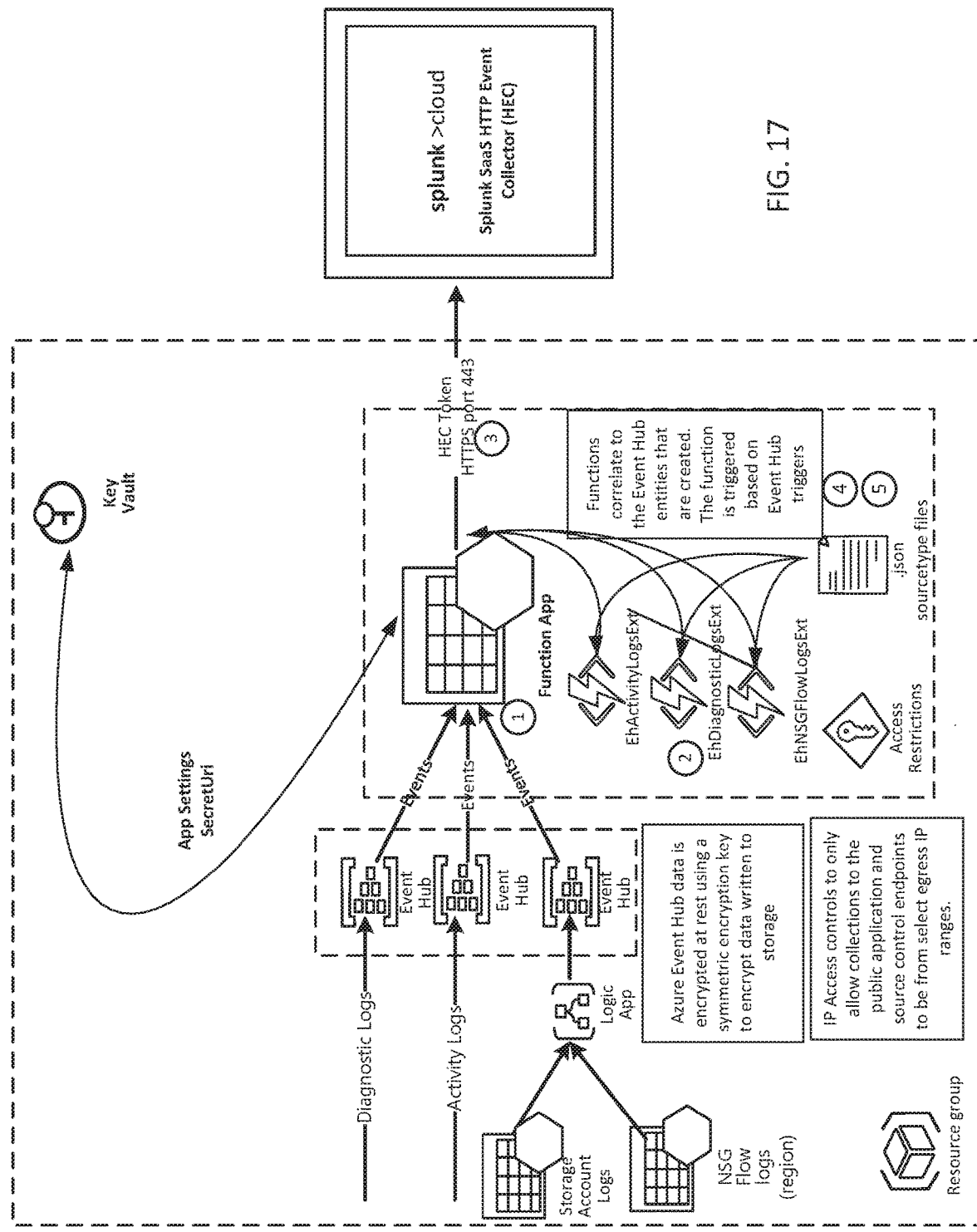
FIG. 17 illustrates an example of cloud security monitoring in Azure cloud with a function application generating a HEC token flow to Splunk Cloud according to an embodiment of the invention.

FIG. 17 illustrates an example of CSM in Azure cloud with a function application generating a HEC token flow to Splunk Cloud. In one embodiment, a function application may be provided to determine the log source based on log contents and stamped with information that can be interpreted by Splunk Cloud. The function application may also process and send unknown source types to Splunk Cloud. A single HEC token may be provided per tenant to reduce overhead.

Figure 18:
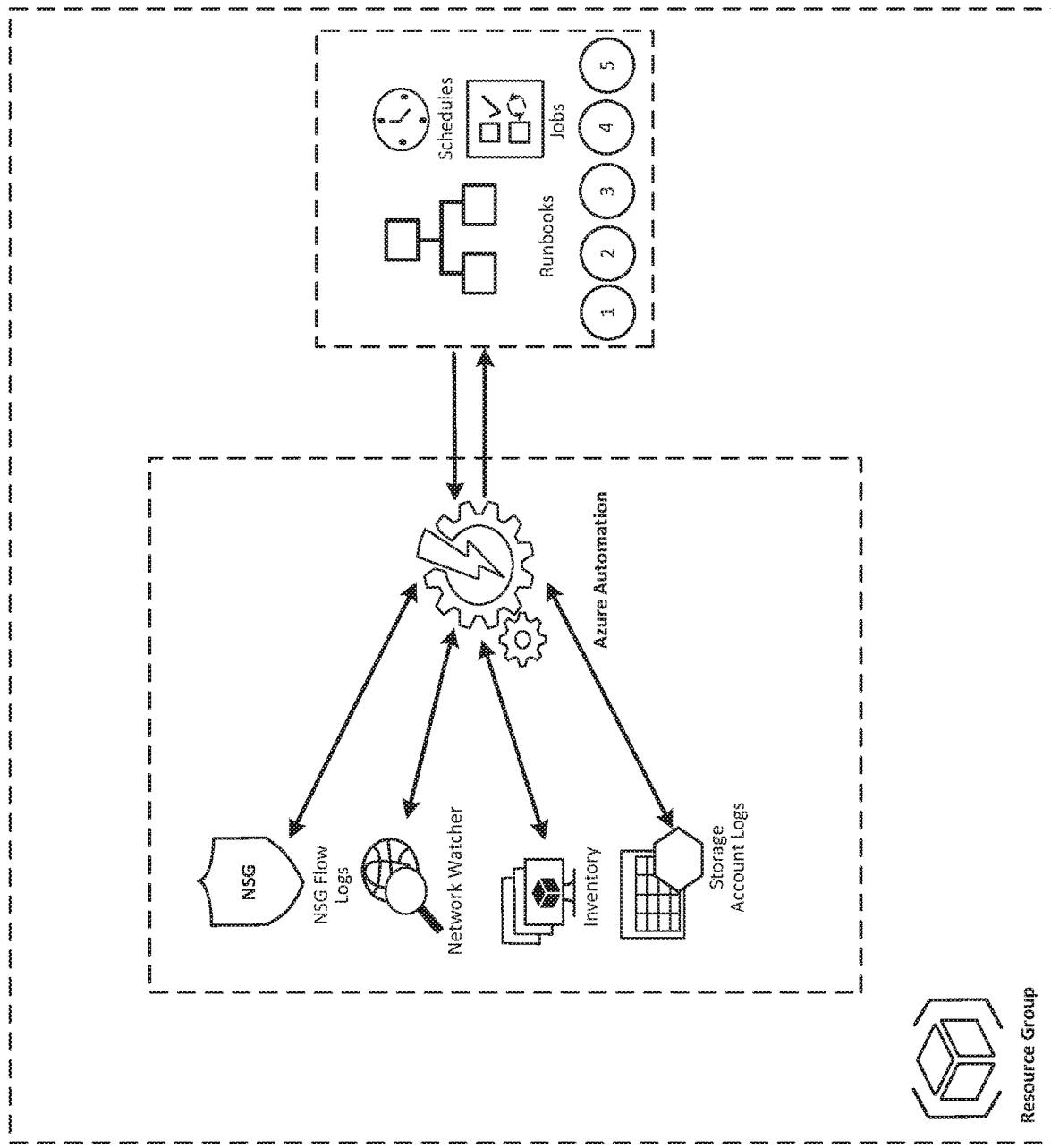
FIG. 18 illustrates an example of cloud security monitoring in Azure cloud with Azure automation and runbooks according to an embodiment of the invention.

FIG. 18 illustrates an example of cloud security monitoring in Azure cloud with Azure automation and runbooks. According to one embodiment, an Azure Automation Runbook (azureinventory_runbook) may be provided to pull resource-level details from Azure Graph as well as information on Azure Security Center configuration, policy assignments, role assignments, and current user list from Azure AD (Active Directory). This runbook may be set to run daily, or in other predetermined time intervals, to push a new set of inventory/configuration on each execution.

According to one embodiment, an enable Network Watcher runbook (enableNetworkWatcher_runbook) may be provided to monitor the NSGs that are currently deployed and to enable Network Watcher in any region in which it needs to be deployed. According to one example, this runbook may be set to run every hour, or in other predetermined time intervals. An enable NSG flow runbook (enableNSGFlow_runbook) may be provided to validate each NSG for flow log settings and to correct those settings if needed. This runbook may point NSG flow logs to the storage accounts that are managed by the CSM model. This runbook may be set to run every hour, or in other predetermined time intervals.

In another embodiment, the CSM solution allows for Configuration Monitoring of the cloud environments. This is done in several ways:
1. For real time alerting of configuration changes or misconfigurations being applied to resources, CSM can make use of the audit logs that are being collected. This log source contains the configuration information that is being applied to the resource (existing or new resource). Alerts can be setup in the STEM to notify security analysts when a resource is improperly configured.
2. Using the native cloud service provider's compliance engines, a number of "rules" have been put in place that allow for a reaction when a misconfiguration is identified. The "rules" contain information that allow for the misconfiguration identification. Once identified, automation is triggered that interacts with the resources API endpoint and a configuration change API call is made. This changes the misconfiguration on the resource to be in compliance with the aforementioned "rules."
3. Third party cloud configuration monitoring software can also be integrated. The identity and permissions assigned to the identity is used by the third-party software and is deployed as part of the CSM solution. This identity is then used by the third party software to analyze the management plane of each environment. This software then alerts when rules are triggered by misconfiguration analysis.

An enable SA (Storage Account) logging runbook (enableSALogging_runbook) may be provided to monitor all storage accounts and to enable logging if needed. This runbook may be set to run every hour, or in other predetermined time intervals. A centralized SA logging runbook (centralizeSALogging_runbook) may be provided to copy new storage logs from the storage log container on every storage account to a centrally managed storage account that is then used to move the logs to Splunk Cloud. In one embodiment, this runbook may be set to run every hour, or in other predetermined time intervals.

Those skilled in the art will appreciate that the diagrams discussed above are merely examples of a CSM system and are not intended to be limiting. Other types and configurations of networks, servers, databases and personal computing devices (e.g., desktop computers, tablet computers, mobile computing devices, smart phones, etc.) may be used with exemplary embodiments of the invention.

Although the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Although examples of servers, databases, and personal computing devices have been described above, exemplary embodiments of the invention may utilize other types of devices whereby a user may interact with a network that transmits and delivers data and information used by the various systems and methods described herein. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art.

In some embodiments, the computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device.

The servers, databases, and personal computing devices described above may include at least one accelerated processing unit, such as a GPU or FPGA, and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software stored in the memory (e.g., non-transitory computer readable medium containing program code instructions executed by the processor) for executing the methods described herein.

Any suitable programming language may be used in accordance with the various embodiments of the invention. For example, the programming language used may include assembly language, Ada, APL, Basic, C, C++, dBase, Forth, HTML, Android, iOS, .NET, Python, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

The software, hardware and services described herein may be provided utilizing one or more cloud service models, such as Software-as-a-Service (SaaS), Platform-as-a-Service (PaaS), Infrastructure-as-a-Service (IaaS), and Logging as a Service (LaaS), and/or using one or more deployment models such as public cloud, private cloud, hybrid cloud, and/or community cloud models.

In the system and method of exemplary embodiments of the invention, a variety of user interfaces may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor.

Although the embodiments of the invention have been described herein in the context of a particular implementation in a particular environment for a particular purpose, those skilled in the art will recognize that its usefulness is not limited thereto and that the embodiments of the invention can be beneficially implemented in other related environments for similar purposes.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents. The specification and drawings are accordingly to be regarded as an illustrative rather than restrictive sense.

What is claimed is:

1. A computer-implemented system for security monitoring of a plurality of Member accounts, wherein the Member accounts are provided as a plurality of instances of cloud services in one or more monitored clouds by one or more cloud service providers, the system comprising:
    an electronic memory; and
    a computer processor coupled to the electronic memory, wherein the computer processor is programmed to:
    automatically deploy software to the plurality of Member accounts, wherein the software is configured to monitor activities in the Member accounts and to push security and operations data to the electronic memory which is associated with a security incident and event management (SIEM) platform, and wherein the security and operations data comprises activity logs and alerts for the Member accounts;
    receive the security and operations data;
    provide a user interface for a system administrator or security analyst to define customized alerts based on the security and operations data; and
    generate the customized alerts and send the customized alerts to the system administrator or security analyst relating to activities in the Member accounts, wherein the SIEM platform is one of a plurality of SIEM platforms of a plurality of cloud service providers (CSPs), wherein the computer processor is further programmed to extract one or more alerts from each of the CSPs, and wherein the one or more alerts extracted from each of the CSPs are correlated to form one or more additional higher-order alerts.

2. The computer-implemented system of claim 1, wherein the security and operations data further comprises public internet protocol (IP) addresses used by the Member accounts.

3. The computer-implemented system of claim 2, wherein the security and operations data further comprises data for identifying information for individuals and information technology (IT) assets associated with the Member accounts.

4. The computer-implemented system of claim 1, wherein the software is further configured to reside in a plurality of locations in said one or more monitored clouds.

5. The computer-implemented system of claim 1, wherein the software is further configured to interact with all ports associated with an IP address.

6. The computer-implemented system of claim 1, wherein the computer processor is further programmed to automatically scrape assigned public IP addresses from said one or more monitored clouds.

7. The computer-implemented system of claim 1, wherein the software that is configured to monitor activities in the Member accounts is further configured to monitor a security posture of the system.

8. The computer-implemented system of claim 1, wherein the computer processor is further programmed to aggregate the security and operations data from the Member accounts and CSPs to a centralized depository to allow storage of a copy of Member account logs in a segregated environment.

9. The computer-implemented system of claim 1, wherein the computer processor is further programmed to push the security and operations data to a centralized repository that does not require credentials in each of the Member accounts and CSPs for data retrieval.

10. The computer-implemented system of claim 9, wherein the security and operations data is pushed to the centralized repository to allow real-time monitoring and response as soon as an event is registered or an alert is generated.

11. The computer-implemented system of claim 1, wherein the computer processor is further programmed to remediate automatically the security and operations data after an unintentional misconfiguration or an intentional tampering.

12. The computer-implemented system of claim 1, wherein the computer processor is further programmed to deploy automatically a plurality of security agents to a plurality of virtual servers.

13. The computer-implemented system of claim 1, wherein the software is further configured to monitor activities in the Member accounts for application monitoring, IT operations, cloud billing or usage.

14. The computer-implemented system of claim 1, wherein the computer processor is further programmed to update automatically the software with a newer version from a centralized repository.

15. A computer-implemented method for security monitoring of a plurality of Member accounts, wherein the Member accounts are provided as a plurality of instances of cloud services in one or more monitored clouds by one or more cloud service providers, the computer-implemented method comprising:
   automatically deploying software to the plurality of Member accounts, wherein the software is configured to monitor activities in the Member accounts and to push security and operations data to the electronic memory which is associated with a security incident and event management (SIEM) platform, and wherein the security and operations data comprises activity logs and alerts for the Member accounts;
   receiving the security and operations data;
   providing a user interface for a system administrator or security analyst to define customized alerts based on the security and operations data; and
   generating the customized alerts and sending the customized alerts to the system administrator or security analyst relating to activities in the Member accounts, wherein the SIEM platform is one of a plurality of SIEM platforms of a plurality of cloud service providers (CSPs), further comprising extracting one or more alerts from each of the CSPs, and correlating the one or more alerts extracted from each of the CSPs to form one or more additional higher-order alerts.

16. The computer-implemented method of claim 15, wherein the security and operations data further comprises public internet protocol (IP) addresses used by the Member accounts.

17. The computer-implemented method of claim 16, wherein the security and operations data further comprises data for identifying information for individuals and information technology (IT) assets associated with the Member accounts.

18. The computer-implemented method of claim 15, wherein the software is further configured to reside in a plurality of locations in said one or more monitored clouds.

19. The computer-implemented method of claim 15, wherein the software is further configured to interact with all ports associated with an IP address.

20. The computer-implemented method of claim 15, further comprising automatically scraping assigned public IP addresses from said one or more monitored clouds.

21. The computer-implemented method of claim 15, wherein the software that is configured to monitor activities in the Member accounts is further configured to monitor a security posture of the system.

22. The computer-implemented method of claim 15, further comprising aggregating the security and operations data from the Member accounts and CSPs to a centralized depository to allow storage of a copy of Member account logs in a segregated environment.

23. The computer-implemented method of claim 15, further comprising pushing the security and operations data to a centralized repository that does not require credentials in each of the Member accounts and CSPs for data retrieval.

24. The computer-implemented method of claim 23, wherein the security and operations data is pushed to the centralized repository to allow real-time monitoring and response as soon as an event is registered or an alert is generated.

25. The computer-implemented method of claim 15, further comprising remediating automatically the security and operations data after an unintentional misconfiguration or an intentional tampering.

26. The computer-implemented method of claim 15, further comprising deploying automatically a plurality of security agents to a plurality of virtual servers.

27. The computer-implemented method of claim 15, wherein the software is further configured to monitor activities in the Member accounts for application monitoring, IT operations, cloud billing or usage.

28. The computer-implemented method of claim 15, further comprising updating automatically the software with a newer version from a centralized repository.

* * * * *